US007964063B2

(12) United States Patent
Deng et al.

(10) Patent No.: US 7,964,063 B2
(45) Date of Patent: Jun. 21, 2011

(54) METHODS AND COMPOSITIONS FOR PAPERMAKING

(75) Inventors: Yulin Deng, Marietta, GA (US); Se-Young Yoon, Atlanta, GA (US); Arthur Ragauskas, Lawrenceville, GA (US); David White, Savannah, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 937 days.

(21) Appl. No.: 11/838,124

(22) Filed: Aug. 13, 2007

(65) Prior Publication Data

US 2008/0087396 A1 Apr. 17, 2008

Related U.S. Application Data

(60) Provisional application No. 60/837,461, filed on Aug. 11, 2006, provisional application No. 60/892,369, filed on Mar. 1, 2007.

(51) Int. Cl.
*D21H 21/00* (2006.01)
*D21H 17/28* (2006.01)
*D21H 17/69* (2006.01)
*C09C 3/10* (2006.01)

(52) U.S. Cl. ............... 162/175; 162/158; 162/181.2; 162/181.8; 162/185; 428/403; 106/463; 106/464; 106/468; 106/471

(58) Field of Classification Search ............ 106/463, 106/464, 465, 468, 471; 162/175, 181.2, 162/181.8, 185, 158; 428/403, 407
See application file for complete search history.

(56) References Cited

U.S. PATENT DOCUMENTS 2,266,233 A * 12/1941 McCleary .............. 106/449
(Continued)

FOREIGN PATENT DOCUMENTS

CA 2037525 9/1991
(Continued)

OTHER PUBLICATIONS

"Carbon Dioxide-Carbonic Acid Equilibrium", class notes [online] Chemistry and Biochemistry Department, Utah State University, 2004, pp. 1-5 [retrieved on Nov. 28, 2010], Retrieved from the Internet: <URL:http://www.chem.usu.edu/~sbialkow/Classes/3600/overheads/Carbonate/CO2.html>.*

*Primary Examiner* — Matthew J Daniels
*Assistant Examiner* — Dennis Cordray
(74) *Attorney, Agent, or Firm* — Ryan A. Scneider, Esq.; Jihan A. R. Jenkins, Esq.; Troutman Sanders, LLP

(57) ABSTRACT

The present invention relates to methods for making modified fillers for use in a papermaking process, methods for making a paper using the modified fillers, and modified fillers and paper produced therewith. In one aspect, the present invention provides a method for making a modified filler for use in a papermaking process, which comprises applying a starch composition comprising starch to a reaction composition comprising at least one of fatty acid, rosin acid, and ammonium sulfate to form a reaction mixture; and applying a filler composition comprising a filler to the reaction mixture, whereby forming a modified filler. In another aspect, the present invention provides a method of using a modified filler in a papermaking process, which comprises applying a modified filler to a composition comprising fiber to form a mixture; and processing the mixture, whereby producing a paper.

21 Claims, 43 Drawing Sheets

U.S. PATENT DOCUMENTS

| | | | | |
|---|---|---|---|---|
| 3,357,844 A | * | 12/1967 | Wood et al. | 106/156.22 |
| 4,139,699 A | | 2/1979 | Hernandez | |
| 4,210,490 A | * | 7/1980 | Taylor | 162/175 |
| 4,295,933 A | | 10/1981 | Smith | |
| 5,043,017 A | * | 8/1991 | Passaretti | 106/465 |
| 5,264,030 A | * | 11/1993 | Tanabe et al. | 106/401 |
| 5,411,639 A | | 5/1995 | Kurrle | |
| 5,514,212 A | * | 5/1996 | Kurrle | 106/465 |
| 5,759,346 A | * | 6/1998 | Vinson | 162/123 |
| 2003/0049447 A1 | * | 3/2003 | Perrier et al. | 428/403 |
| 2005/0155520 A1 | * | 7/2005 | Van Der Horst et al. | 106/465 |

FOREIGN PATENT DOCUMENTS

| | | |
|---|---|---|
| CA | 2 405 999 A1 | 11/2001 |
| CA | 2444011 | 10/2002 |
| WO | WO01/14274 | 3/2001 |

* cited by examiner

METHODS AND COMPOSITIONS FOR PAPERMAKING

RELATED APPLICATIONS

The present application claims the priority of U.S. Provisional Patent Application No. 60/837,461, filed Aug. 11, 2006, and U.S. Provisional Patent Application No. 60/892,369, filed Mar. 1, 2007, which are herein incorporated in its entirety.

TECHNICAL FIELD OF THE INVENTION

The present invention relates to papermaking, more specifically to surface-modified fillers that are useful in papermaking processes and methods of making and using same.

BACKGROUND OF THE INVENTION

Increasing the filler content of paper has been driven by efforts to reduce papermaking cost, improve the water removal rate during papermaking, and improve optical properties and printability of the paper product. There are, however, limits to the amount of filler that can be substituted for papermaking fiber. At high filler contents, paper can suffer losses in strength, stiffness, bulk, and sizing. All commonly used unmodified fillers (e.g., clay, titanium dioxide, and calcium carbonate) are known to have detrimental effects on strength and sizing. Increasing the concentration of filler in conventional papermaking furnishes results in increased size demand to maintain the desired degree of water repellency in the finished paper. In particular, poor sizing efficiency and loss of water repellency over time are problems associated with the use of alkyl ketene dimer (AKD) and alkenyl succinic anhydride (ASA) sizing agents and precipitated calcium carbonate (PCC), particularly in highly filled alkaline papers. In addition, strength properties decrease as filler levels increase, impacting negatively on converting operations and end use functionality. Thus, in circumstances where increasing filler content would be advantageous, associated sizing problems have occurred affecting paper quality and machine performance.

Traditionally, starch has been used in wet-end papermaking applications because of its relatively low price and its ability to improve paper strength. It is believed that starch adsorbs to wood fibers during wet-end processing and enhances bonding through the formation of hydrogen bonds. The improvements in dry strength may also due to increases in shear strength per unit bonded area. Although starch can improve the strength of paper, high starch addition in wet-end papermaking process can also cause problems, such as, poor retention of raw starch in a pulp furnish. Cationic groups are usually introduced to enhance the adsorption of starch to anionically charged wood fiber surfaces. However, such chemical modification of starch significantly increases the cost of papermaking. Moreover, although the adsorption of starch can be improved by introducing cationic groups, the retention of starch on wood fibers may still be a problem when anionic trash in the wet-end furnish is high, e.g., when ground wood pulps and recycled fibers are used.

Although many approaches have been studied for improving the paper strength at high filler contents, such as, preflocculation, lumen loading, chemically treated filler with polymer, and filler-wood fine composites, very few have delivered a practical solution to paper manufacturers.

BRIEF SUMMARY OF THE INVENTION

Briefly described, in its preferred form, the present invention relates to methods for making modified fillers for use in a papermaking process, methods for making a paper using the modified fillers, and modified fillers and paper produced therewith.

In one aspect, the present invention provides a method for making a modified filler for use in a papermaking process, which comprises (1) applying a starch composition comprising starch to a reaction composition comprising at least one of fatty acid, rosin acid, and ammonium sulfate to form a reaction mixture; and (2) applying a filler composition comprising a filler (e.g., a clay or a calcium sulfate) to the reaction mixture, whereby forming a modified filler. In one embodiment, the starch composition, the reaction composition, and the filler composition may be mixed substantially simultaneously. In another embodiment, the reaction composition may comprise at least one of fatty acid, rosin acid, and a salt thereof. In yet another embodiment, the pH of the reaction mixture may be a pH of less than about 7. In still another embodiment, the method further comprises crosslinking starch on the surface of the modified filler with a crosslinker.

In another aspect, the present invention provides a method for making a modified filler for use in a papermaking process, which comprises (1) applying a reaction composition comprising at least one of fatty acid and rosin acid to a starch composition comprising starch to form a reaction mixture; and (2) applying a filler composition comprising precipitated calcium carbonate ("PCC") to the reaction mixture, whereby forming a modified filler comprising PCC, wherein the fatty acid:starch ratio or the rosin acid:starch ratio is above about 10%. In one embodiment, the starch:filler ratio may be from about 30% to about 200%. In another embodiment, the method may further comprise adjusting pH of the starch composition or the reaction mixture to a pH of above about 7.

In addition, the present invention provides a method of using a modified filler in a papermaking process, which comprises (1) applying a modified filler to a composition comprising fiber to form a mixture; and (2) processing the mixture, whereby producing a paper. In one embodiment, the modified filler is produced in accordance with a method which comprises (1) applying a starch composition comprising starch to a reaction composition comprising at least one of fatty acid, rosin acid, and ammonium sulfate to form a reaction mixture; and (2) applying a filler composition comprising a filler to the reaction mixture, whereby forming a modified filler. In another embodiment, the modified filler is produced in accordance with a method which comprises (1) applying a reaction composition comprising at least one of fatty acid and rosin acid to a starch composition comprising starch to form a reaction mixture; and (2) applying a filler composition comprising PCC to the reaction mixture, whereby forming a modified filler comprising PCC, wherein the fatty acid:starch ratio or the rosin acid starch ratio is above about 10%.

Also provided are modified fillers produced in accordance with the methods of the present invention, methods of making paper using the modified fillers, and paper products produced therewith.

Other features and advantages of the present invention will become apparent from the following detailed description. It should be understood, however, that the detailed description and the specific examples, while indicating the preferred embodiments of the present invention, are given by way of illustration only, since various changes and modifications within the spirit and scope of the present invention will become apparent to those skilled in the art from this detailed description. These and other objects, features and advantages of the present invention will become more apparent upon reading the following specification in conjunction with the accompanying drawing figures, if any.

DETAILED DESCRIPTION OF THE PREFERRED EMBODIMENTS

Figure 1:
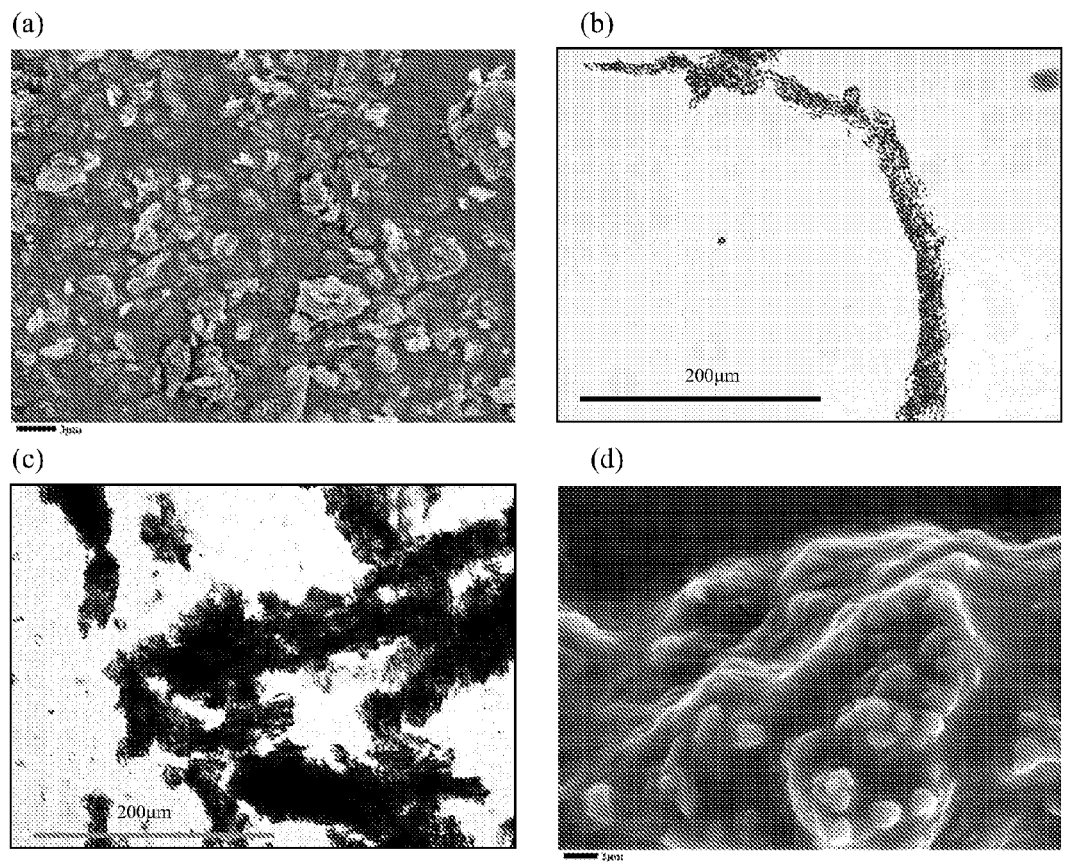
FIG. 1 (a)-(d) show representative optical microscope and SEM images of unmodified clay and clay-starch composites produced in accordance with the one embodiment of the present invention. (a): SEM image of unmodified clay; (b) and (c): optical microscope images of clay-starch composites with to starch ratio of 1:1; and (d) SEM image of clay-starch composites with to starch ratio of 1:1.

As used herein and in the appended claims, the singular forms "a," "an," and "the" include plural references, unless the content clearly dictates otherwise. Thus, for example, reference to "a starch" includes a plurality of such starches and equivalents thereof known to those skilled in the art, and reference to "the composite" is a reference to one or more such composites and equivalents thereof known to those skilled in the art, and so forth. All publications, patent applications, patents, and other references mentioned herein are incorporated by reference in their entirety.

The present invention generally relates to methods for making modified fillers for use in a papermaking process, methods for making a paper using the modified fillers, and modified fillers and paper produced therewith. The methods and compositions of the present invention may offer a variety of benefits, such as, without limitation, improving the properties of the paper product (e.g., tensile strength, ZDT strength, stiffness, bulk, water repellency, brightness, and opacity), improving filler retention, cost effective, and environment friendly.

In one aspect, the present invention provides a method for making a modified filler for use in a papermaking process, which comprises applying a composition comprising fatty acid to a composition comprising starch to create a reaction mixture; and isolating a modified filler comprising starch-fatty acid complex from the reaction mixture. In one embodiment, the method further comprises applying a composition comprising an unmodified filler (e.g., without limitation, clay and calcium sulfate) to the reaction mixture.

Untreated/unmodified fillers suitable for the purposes of the present invention are well known in the art, such as, without limitation, starch, clay, precipitated calcium carbonate ("PCC"), calcium sulfate (Gypsum), kaolin, titanium dioxide, gypsum, talc, natural and synthetic calcium carbonates, chalk, ground marble, hydrogenated aluminum oxides (aluminum trihydroxides), barium sulphate, and calcium oxalate. In one embodiment, the modified filler of the present invention may be a surface-modified clay, PCC, or calcium sulfate. In another embodiment, the modified filler of the present invention may be a starch-fatty acid composite. The term "starch," as used herein, include, without limitation, starch and starch derivatives of natural, synthetic, semi-synthetic origin, and/or mixtures thereof. Natural starch may be originated from barley, potato, wheat, oats, pea, corn, tapioca, sago, or rice or similar tuber vegetables or cereal crops. Typically, starch derivatives may be starch esters prepared from native starch, hydrolyzed starch, oxidized starch, bridged starch, or gelatinized starch.

Fatty acids suitable for the purposes of the present invention are well known in the art. Such fatty acids may be saturated fatty acids, unsaturated fatty acids, a composition comprising a single fatty acid, a composition comprising a plurality of fatty acids (e.g., animal fat or vegetable oil), salt or other derivatives of fatty acids, or a mixture thereof. The term "fatty acids," as used herein, include, without limitation, fatty acids and fatty acids derivatives of natural, synthetic, semi-synthetic origin, and/or mixtures thereof. Examples of suitable fatty acids include, without limitation, lauric acid (dodecanoic acid), myristic acid (tetradecanoic acid), palmitic acid (hexadecanoic acid), stearic acid (octadecanoic acid), arachidic acid (eicosanoic acid), behenic acid, myristoleic acid, palmitoleic acid, oleic acid, linoleic acid, alpha-linolenic acid, arachidonic acid, eicosapentaenoic acid, erucic acid, docosahexaenoic acid, lard, butter, animal fats, vegetable fats, wax, coconut oil, palm oil, cottonseed oil, wheat germ oil, soy oil, olive oil, corn oil, sunflower oil, safflower oil, rapeseed/canola oil, and their derivatives. In one embodiment of the present invention, the fatty acid is palmitic acid.

The method of present invention may further comprise a step of adjusting the pH of the reaction mixture to a pH less than about 7 (e.g., pH 5) to facilitate the isolation of the modified filler. The term "isolating," as used herein, refers to, without limitation, completely or partially separating, purifying, and/or precipitating a substance (e.g., a modified filler) from a mixture (e.g., the reaction mixture). The isolated filler may be pure or substantially pure filler, or a composition or composite comprising a mixture of the filler and other substance. The pH of the reaction mixture may be adjusted using techniques known in the art. In one embodiment, before the step of adjusting the pH of the reaction mixture to a pH less than about 7, the method of present invention may further comprise a step of adjusting the pH of the reaction mixture to a pH above about 7 to achieve at least one desirable result, such as, without limitation, to facilitate the dissolving a reaction component, to facilitate the formation of starch-fatty acid complex, or to facilitate the formation of filler-starch-fatty acid composite.

In another aspect, the present invention provides a method for making a modified filler for use in a papermaking process, which comprises (1) applying a composition comprising a filler to a composition comprising starch to create a reaction mixture; (2) applying a composition comprising ammonium sulfate to the reaction mixture; and (3) isolating a modified filler comprising the filler and starch from the reaction mixture. In one embodiment, the modified filler comprises a surface-modified clay or a surface-modified calcium sulfate. In another embodiment, the method of the present invention further comprises crosslinking starch on the surface of the modified filler with a crosslinker. Crosslinkers suitable for the purposes of the present invention are well known in the art. Exemplary crosslinkers include, but are not limited to, glyoxals (including, without limitation, blocked and straight or unblocked glyoxal-based insolubilizers), aliphatic epoxy resins, melamine formaldehyde resins, ammonium zirconium carbonates, potassium zirconium carbonate (KZC), blocked isocyanates, and mixtures thereof.

The present invention further provides a method for making a modified filler for use in a papermaking process, which comprises (1) applying a composition comprising fatty acid to a starch composition comprising starch to create a reaction mixture; (2) applying a filler composition comprising precipitated calcium carbonate ("PCC") to the reaction mixture; and (3) isolating a modified filler comprising PCC and starch-fatty acid complex (e.g., PCC surface-modified with starch-fatty acid complex) from the reaction mixture, wherein the fatty acid starch ratio may be above about 10%.

In one embodiment, the fatty acid:starch ratio may be about 10% to about 30%, or from about 10% to about 20%, or about 15%. In another embodiment, the starch:fatty acid ratio may be from about 30% to about 200%. In yet another embodiment, the method may further comprise adjusting pH of the starch composition or the reaction mixture to a pH of above about 7 (e.g., pH 11). In still another embodiment, the pH of the starch composition or the reaction mixture may be a pH of above about 7.

In addition, the present invention provides a method of using a modified filler in a papermaking process, wherein the modified filler is produced in accordance with a method which comprises (1) applying a composition comprising fatty acid to a composition comprising starch to create a reaction mixture; and (2) isolating a modified filler comprising starch-fatty acid complex from the reaction mixture. In one embodiment, the method of the present invention further comprises applying a composition comprising clay or calcium sulfate to the reaction mixture, wherein the modified filler produced and isolated comprises a surface-modified clay or a surface-modified calcium sulfate. In another embodiment, the method of the present invention further comprises adjusting the pH of the reaction mixture to a pH less than about 7.

The present invention provides a method of using a modified filler in a papermaking process, wherein the modified filler is produced in accordance with a method which comprises (1) applying a composition comprising a filler to a composition comprising starch to create a reaction mixture; (2) applying a composition comprising ammonium sulfate to the reaction mixture; and (3) isolating a modified filler comprising the filler and starch from the reaction mixture. In one embodiment, the method of the present invention may further comprise crosslinking starch on the surface of the surface-modified filler using a crosslinker.

In one aspect, the present invention provides a method for making a modified filler for use in a papermaking process, which comprises (1) applying a starch composition comprising starch to a reaction composition comprising at least one of fatty acid, rosin acid, and ammonium sulfate to form a reaction mixture; and (2) applying a filler composition comprising a filler (e.g., a clay or a calcium sulfate) to the reaction mixture, whereby forming a modified filler. In one embodiment, the starch composition, the reaction composition, and the filler composition may be mixed substantially simultaneously. In another embodiment, the reaction composition may comprise at least one of fatty acid, rosin acid, and a salt thereof. In yet another embodiment, the pH of the reaction mixture may be a pH of less than about 7. In still another embodiment, the method further comprises crosslinking starch on the surface of the modified filler with a crosslinker.

Rosin acids suitable for the purposes of the present invention are well known in the art. Such rosin acids may be a composition comprising a single rosin acid, a composition comprising a plurality of rosin acids, salts or other derivatives of rosin acids, fortified rosin, or a mixture thereof. The term "rosin acids," as used herein, include, without limitation, rosin acids and rosin acids derivatives of natural, synthetic, semi-synthetic origin, and/or mixtures thereof. Examples of suitable rosin acids include, without limitation, abietic acids (e.g., abieta-7,13-dien-18-oic acid, and 13-isopropylpodocarpa-7,13-dien-15-oic acid), neoabietic acid, dehydroabietic acid, palustric acid, pimaric acid (e.g., pimara-8 (14),15-dien-18-oic acid), levopimaric acid, and isopimaric acids.

In another aspect, the present invention provides a method for making a modified filler for use in a papermaking process, which comprises (1) applying a reaction composition comprising at least one of fatty acid and rosin acid to a starch composition comprising starch to form a reaction mixture; and (2) applying a filler composition comprising precipitated calcium carbonate ("PCC") to the reaction mixture, whereby forming a modified filler comprising PCC, wherein the fatty acid:starch ratio or the rosin acid:starch ratio is above about 10%. In one embodiment, the starch:filler ratio may be from about 30% to about 200%. In another embodiment, the method may further comprise adjusting pH of the starch composition or the reaction mixture to a pH of above about 7.

In addition, the present invention provides a method of using a modified filler in a papermaking process, which comprises (1) applying a modified filler to a composition comprising fiber to form a mixture; and (2) processing the mixture, whereby producing a paper. In one embodiment, the modified filler is produced in accordance with a method which comprises (1) applying a starch composition comprising starch to a reaction composition comprising at least one of fatty acid, rosin acid, and ammonium sulfate to form a reaction mixture; and (2) applying a filler composition comprising a filler to the reaction mixture, whereby forming a modified filler. In another embodiment, the modified filler is produced in accordance with a method which comprises (1) applying a reaction composition comprising at least one of fatty acid and rosin acid to a starch composition comprising starch to form a reaction mixture; and (2) applying a filler composition comprising PCC to the reaction mixture, whereby forming a modified filler comprising PCC, wherein the fatty acid:starch ratio or the rosin acid starch ratio is above about 10%.

Also provided are modified fillers produced in accordance with the methods of the present invention and paper products produced therewith. The term "paper," as used herein, is meant to encompass, but is not limited to, any substrate based on cellulosic fibers; synthetic polymer films and fibers such as polyamides, polyesters, polyethylene, and polyacrylic; inorganic fibers such as asbestos, ceramic, and glass fibers; and any combination of cellulosic, synthetic, and inorganic fibers or a combination of cellulosic fiber and synthetic polymer films produced by extrusion or coating the cellulosic fiber substrate. The paper may be composed of compressed natural or synthetic fibers, of compressed natural or synthetic solids, or of a woven appearance such as a textile or canvas. The paper may be an opaque or a see-through substrate such as used with an overhead projector, and the substrate may be of any dimension (e.g., size or thickness) or form (e.g., pulp, wet paper, and dry paper). Also, the paper may have a smooth or textured appearance, e.g., a canvas-look texture. Exemplary paper include, without limitation, printing paper (e.g., inkjet printing paper), writing paper, drawing paper, and the like, as well as board materials such as cardboard, poster board, Bristol board, and the like.

The present invention is further illustrated by way of the examples contained herein, which are set forth to aid in the understanding of the invention. The exemplary embodiments should not to be construed in any way as imposing limitations upon the scope thereof.

EXAMPLES

Example 1

Materials

Calcined kaolin clay was obtained from Dry Branch Kaolin Co., Inc. Raw corn starch was used for this study. Ammonium sulfate was obtained from Aldrich. Bleached hardwood and softwood pulps were each refined in a Valley beater to a freeness of 400 CSF. Equal proportions of the two pulps were mixed, and the mixture was used as the base pulp furnish for the handsheets. Percol-175 (cationic polyacrylamide retention aid) was obtained from Ciba Specialty Chemicals. Crosslinker, Eka AZC 5800LN (Ammonium zirconium carbonate, 30% solution), was obtained from Eka Chemical Inc.

Preparation of Fibrous Clay-starch Composites

Clay-starch composite (1:1) was prepared as described, infra. 5 g of clay was added to 3-4% uncooked raw corn starch suspension that contained 5 g of dry weight starch. The mixture then was stirred and cooked at 95° C. for 30 minutes. Cooked clay-starch mixture was poured into 40% ammonium sulfate solution with 500 rpm stirring speed. Fibrous starch-clay composites were precipitated out after 30 seconds. The resultant composites were collected on filter paper, washed free of salt, and recollected. The filtrated ammonium sulfate solution could be recycled and reused. The clay-starch composites precipitates were re-dispersed in water by mechanical stirring before handsheet making.

Clay-starch composites with a clay:starch of 1:0.5 and 1:0.25, respectively, were also prepared in this study.

In order to determine the effect of crosslinker on the solubility of starch-clay composites, 3% (based on dry starch weight) crosslinker was added to starch-clay suspension and the pH of the composition was adjusted to pH 12 after cooking.

Characterization of Fibrous Clay-starch Composites

The morphology of the clay-starch composites was characterized using Leica DMLM optical microscope with digital camera. Scanning Electron Microscope (SEM) was used for characterizing the composite aggregates.

Swelling and solubility of starch were measured at a number of different temperatures. Wet clay-starch composite (2 g) collected after filtration and washing was agitated in 50 g of distilled water for 30 min. The suspension was cooled to 20° C., then was poured into pre-weighed centrifuge tubes and centrifuged at 3000 rpm for 10 minutes. For the measurement of solubility of starch in the clay-starch composites the supernatants were gathered and tested by measuring total organic content (TOC) using Shimadzu Total Organic Analyzer 5050. Swelling power was obtained from weighing sediments in centrifuge tubes before and after drying using the following Equations:

$$\text{Water solubility}(\%) = \frac{\text{wt. of initial dry starch} - \text{wt. of dry starch not dissolved}}{\text{wt. of initial dry starch}} * 100$$

$$\text{Swelling power} = \frac{\text{wt. of wet starch after centrifuge}}{\text{wt. of starch after drying}}$$

Handsheets Preparation and Determination of Paper Properties

The pulp was diluted to 0.5 wt % and various amounts of composite aggregates were added during the handsheet making. After the addition of composites, the slurry was stirred for 20 sec at 700 rpm without addition of any retention aids. Handsheets with a target basis weight of 60 g/m$^2$ were produced according to TAPPI Test Method T 205 "Forming Handsheets for Physical Tests of Pulp." For comparison, the control handsheets were prepared using pure clay and Percol-175 was added at 0.05-0.1 wt % based on solid fiber for clay retention. After two rounds of wet pressing, all handsheets were dried at 105° C. for 7 min in a dryer (Emerson Speed Dryer, Model 130). Physical properties of the papers were measured according to standard TAPPI methods. The filler content was determined by ashing the paper in a muffler oven according to the standard TAPPI method T211.

Characterization of the Clay-starch Composites

FIG. 1 shows optical microscope and SEM images of clay-starch composites produced in accordance with the method of the present invention. Kaolin clay has plate-like structure and the particle size of less than 3 μm (FIG. 1, (a)). The resulting clay-starch composites (1:1 ratio) have long fibrous structure (FIG. 1, (b) and (c)).

It was found that the starch concentration in the cooking mixture played an important role in composite morphology, e.g., large and thick clay-starch aggregates could be obtained when high starch content solution was used in aggregates preparation. The stirring rate, stirring time, and the ammonium sulfate concentration may also be manipulated to control the aggregate polymorphism. Increasing shearing time or force or decreasing ammonium sulfate concentration tended to decrease the size of composite aggregates.

SEM images of the clay-starch composites also indicate that clays were distributed well inside the composites and perfectly coated by starch. It is expected that this coated starch layer would significantly affect fiber-fiber bonding during papermaking, as discussed, infra.

Figure 2:
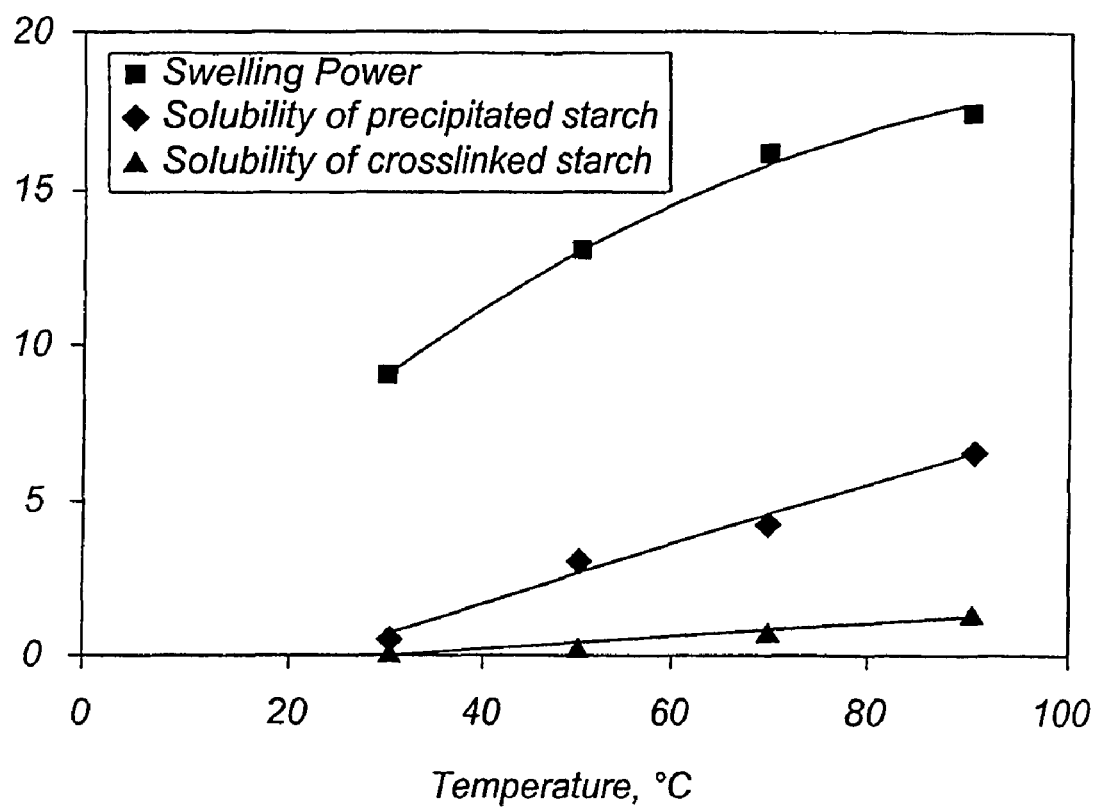
FIG. 2 shows the swelling behavior and solubility of clay-starch composites at various temperatures in accordance with one embodiment of the present invention.

The volume change of coated starch was determined using swelling power. FIG. 2 shows the swelling behavior of clay-starch composites at various temperatures. The data indicate that as temperature increases, the swelling power increases. At 50° C. for 30 minutes, the weight of composite aggregates was about 13 times that of the dried aggregates. Increased volume of composites by swelling might enhance the possibility of hydrogen bonding with wood fibers.

The solubility of coated starch in water under various operational conditions may also be a critical issue for the application of the present invention. If starch is easily dissolved in water, the structure of composite may be disrupted and the clays in composite aggregates may be separated into individual particles. In addition, if the solubility is too high, it may cause a variety of problems in the downstream processes of papermaking, and lower the physical properties of the paper product.

The solubility of precipitated starch in the clay-starch composites of the present invention was studied and the results are shown in FIG. 2. It was found that less 3% of starch was dissolved in water after the composites were dispersed in water at 50° C. for 30 minutes. When the starch was exposed to higher temperatures, the solubility was increased up to about 5%. Crosslinking starch could reduce the solubility of starch even at high temperature. For example, as shown in FIG. 2, the solubility of crosslinked starch increased only slightly over the range of temperatures tested, e.g., a 1.25% increase in solubility at a temperature as high as 90° C.

The Effects of Clay-starch Composites on Paper Strength and Optical Properties

Figure 3:
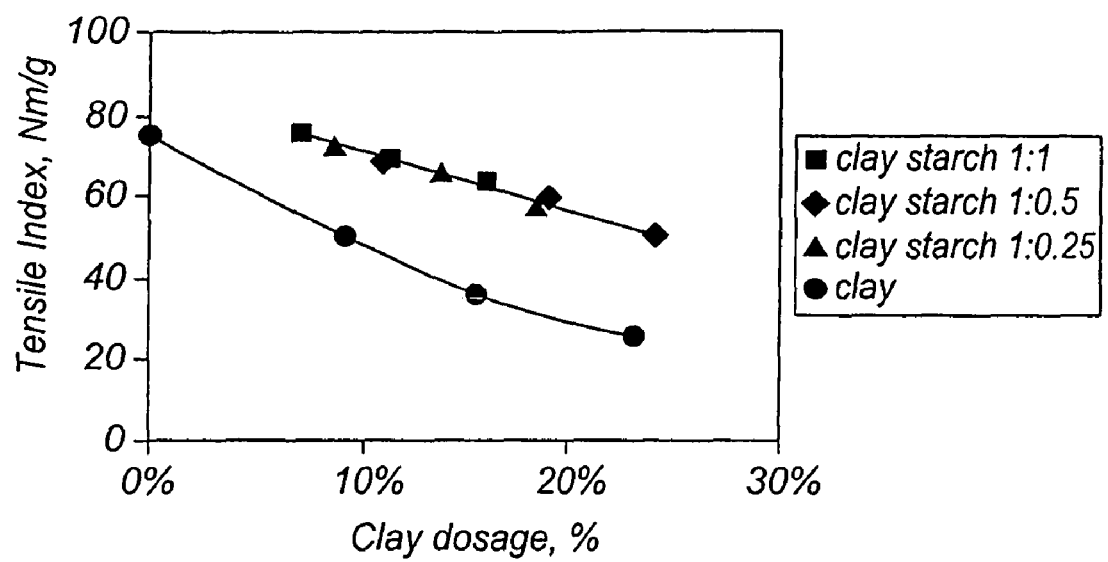
FIG. 3 shows the effects of the clay-starch composites on the tensile strength of paper product in accordance with one embodiment of the present invention.
Figure 4:
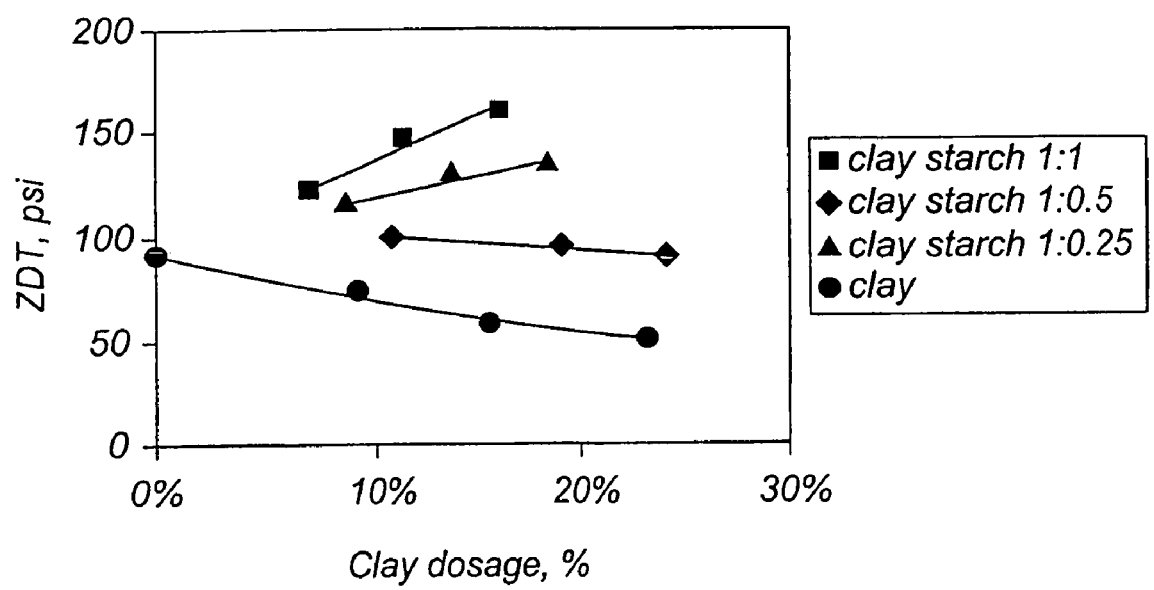
FIG. 4 s shows the effects of the clay-starch composites on the z-direction tensile strength of paper product in accordance with one embodiment of the present invention.

FIGS. 3-6 show the effects of the clay-starch composites on the physical properties of paper product. These data indicate that clay-starch composites could significantly improve paper strength properties compared to conventional papermaking filler. As the content of pure clay increased, the tensile strength of the handsheet made from unmodified clay decreased significantly as shown in FIG. 3. It is generally accepted that strength of paper is attributable to the strength and number of inter-fiber bonds. Clay particles in handsheet interfere with the fiber bonding, which reduces the strength and number of inter-fiber bonds. Therefore, increasing clay content in handsheets may cause a greater reduction in tensile strength. The inventors' previous research suggested that the decrease in inter-fiber bonding by the increasing clay content may be compensated through the improvement of the clay-fiber bonding between the wood fibers and the starch that was coated on filler. It is reported that the starch-coated PCC could improve the tensile strength up to 30% compared to the same amount of pure PCC. As shown in FIG. 3 the tensile strengths of the handsheets made from three different clay-starch composites increased about 110% compared to those of the handsheets made from original clay. The tensile strength of paper combines the intrinsic fiber strength, the bonding strength, and the contact area. Because the fiber intrinsic strength was the same for all handsheets, the increase in the paper strength may be attributed to the increase in inter-fiber bonding and bonding area. It has been proposed that the internal bond strength such as the Scott Bond Energy, the z-direction strength and peel force in delaminating has the relationship with bonding shear strength. FIG. 4 shows the result of z-direction tensile strengths of clay-starch composites filled sheets. For clay-starch composites ratio of 1:1 and 1:0.5, the ZDT increased as composite content increased. However, for the pure clay filled sheets, ZDT deceased as clay content increased. This result indicates that pure clay interferes with fiber-fiber bonding to decrease clay-fiber bonding, however, clay-starch composites may improve clay-fiber bonding due to starch coated on clay surface. Even though ZDT was increased dramatically for clay-starch composites-based handsheets, the tensile strengths slowly decreased as the composite content increased (see, FIG. 3). This suggests that the strength of this fibrous composite itself is much weaker than that of wood fiber. However, the bonding strength of this starch coated composite with wood fiber is much stronger than fiber to fiber bonding.

Figure 5:
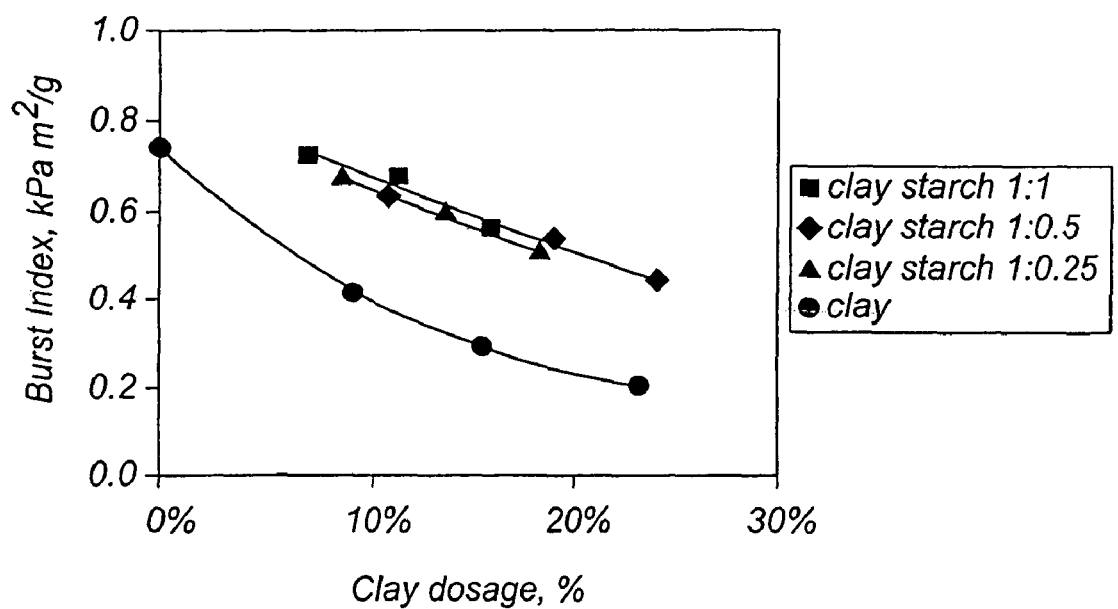
FIG. 5 shows the effects of the clay-starch composites on the burst strength of paper product in accordance with one embodiment of the present invention.
Figure 6:
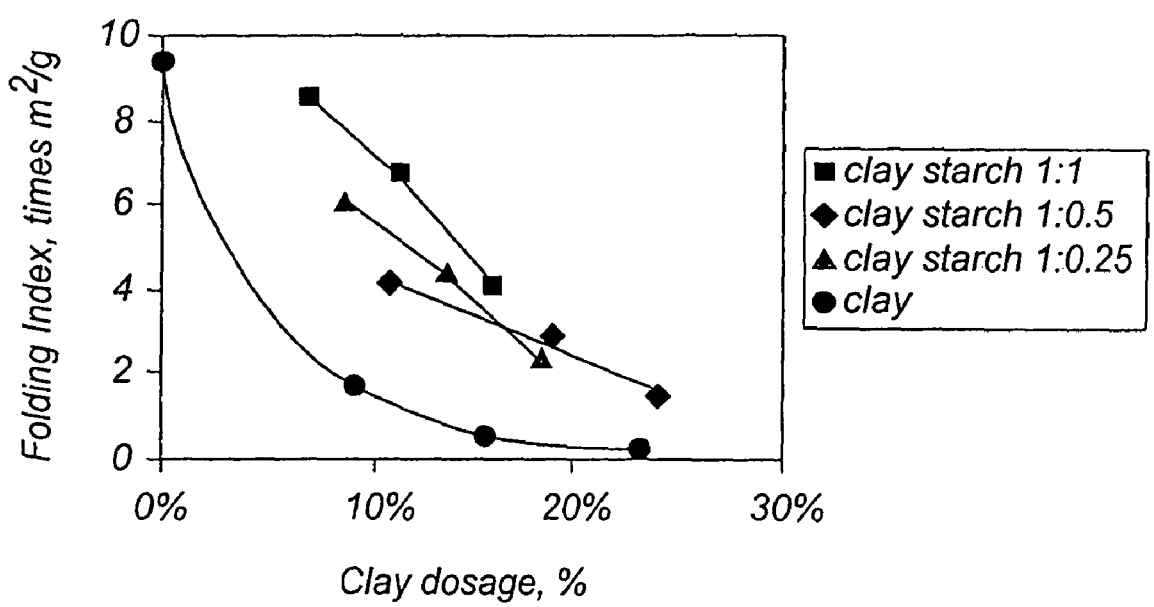
FIG. 6 shows the effects of the clay-starch composites on the folding strength of paper product in accordance with one embodiment of the present invention.

FIGS. 5 and 6 show the effects of the clay-starch composite on burst index and folding index. The burst strengths of three different ratios of clay-starch composites increased about 100% compared to pure clay at 20% clay addition. The tendency of burst strength using clay-starch composite was almost the same as that of tensile strength as shown in FIG. 5. The increase of burst strength may be due to the improved internal bonding of the sheet by the starch. The similar trend was seen for folding strength of the handsheets, i.e., addition of pure clay reduced folding strength dramatically but the uses of the clay-starch composites of the present invention caused less reduction on the folding strength. It was also found that the folding strength can be significantly improved when the starch ratio in the composites was increased.

Figure 7:
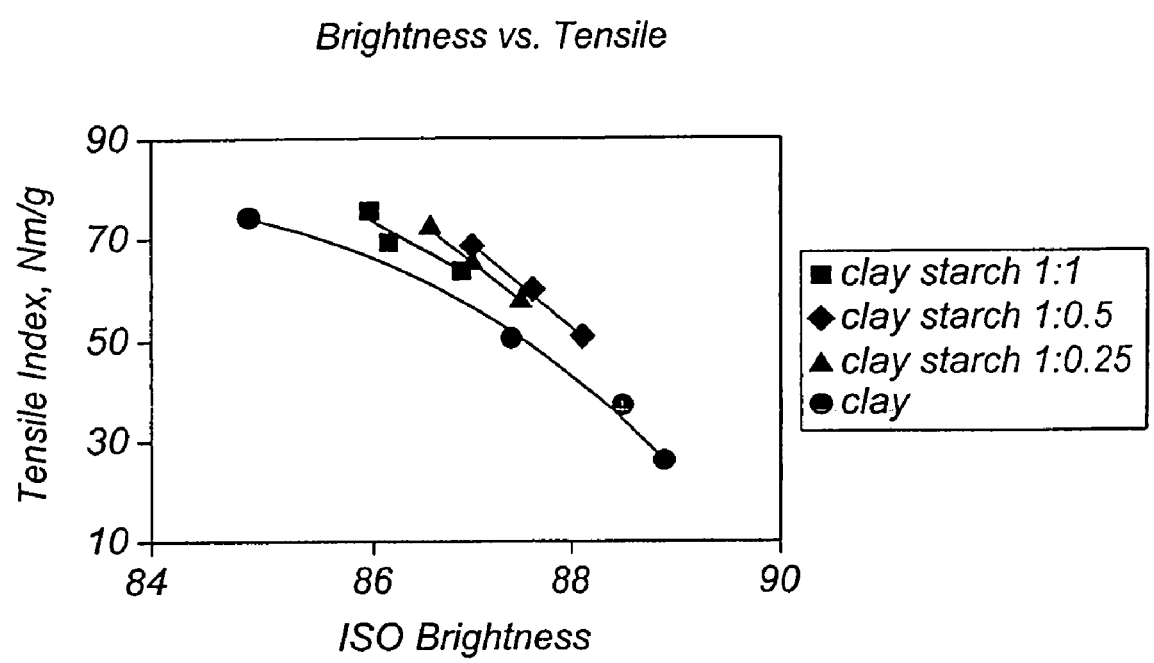
FIG. 7 shows the brightness and tensile index of handsheets made with pure clay and clay-starch composites in accordance with one embodiment of the present invention.
Figure 8:
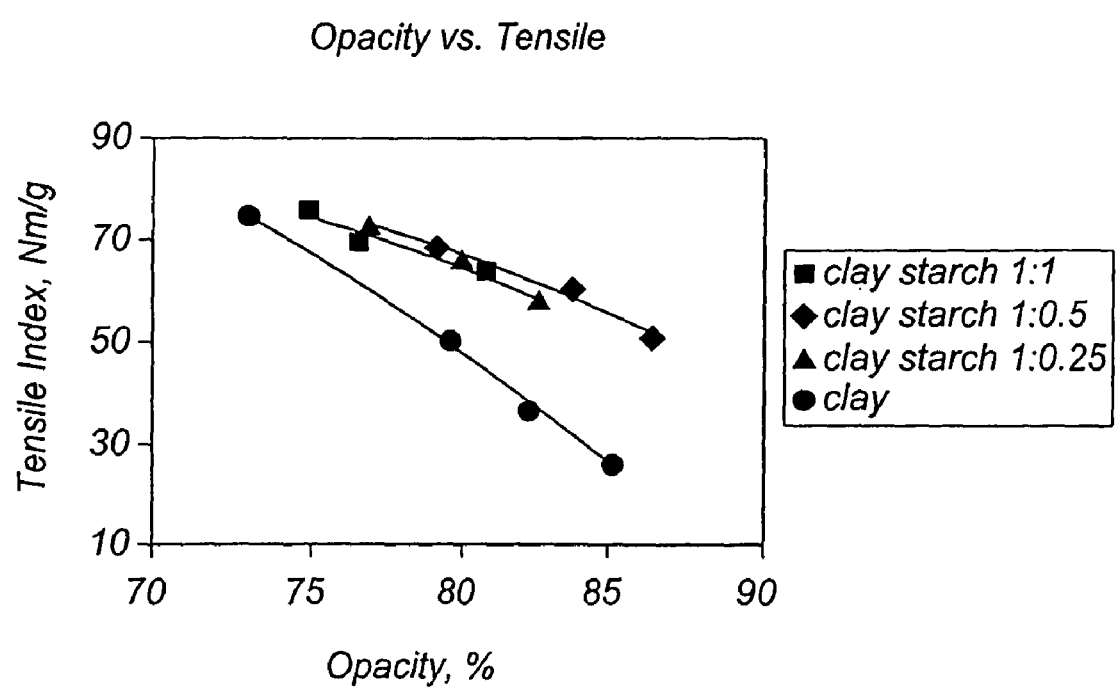
FIG. 8 shows the opacity and tensile index of handsheets made with pure clay and clay-starch composites in accordance with one embodiment of the present invention.

FIGS. 7 and 8 depict the brightness and opacity of handsheets made with pure clay and clay-starch composites. The increase of the clay-starch content in sheets improved paper brightness and opacity, although the degree of the improvement was less than that of the pure clay. However, the small difference in the optical property improvement between starch-clay composite and pure clay may not create a substantial issue because it may be compensated by adding more composites to the paper without sacrificing the strength. This can be seen by comparing the handsheet optical properties at the same tensile strength as shown in FIGS. 7 and 8.

Bonding of Clay-starch Composites with Fiber

Figure 9:
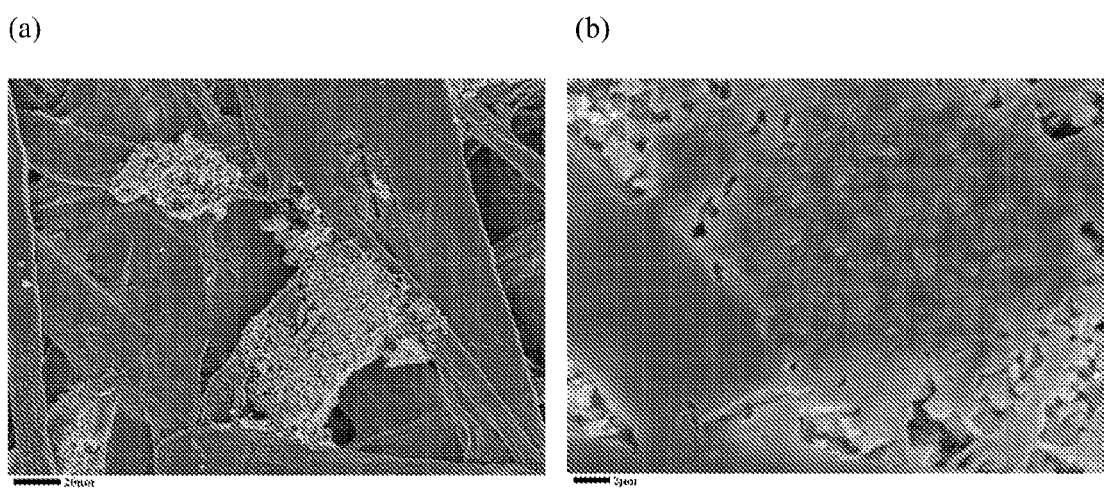
FIGS. 9 (a) and (b) show representative SEM images of clay-starch composites filled handsheets produced in accordance with the one embodiment of the present invention. (a) Clay: starch=1:0.25; (b) clay:starch=1:0.5.

ZDT test results show that internal bonding was improved by adding clay-starch composites comparing to using pure clay. In order to investigate the bonding between wood fiber and the composites, the surface of handsheets filled with clay-starch composites was studied by using SEM. A number of the clay-starch composites were stuck on the wood fiber surface and have almost no individual clay particles on fiber surface or between fibers as shown in FIG. 9 (a). The fibrils from the fiber are strongly bounded with the composites to the point that the boundaries of them could not been clearly observed even at higher amplification. Appearances of clay-starch composites were also changed during pressing and drying. As shown in FIG. 9(b), the thermo-plasticization caused the swollen starch to penetrate into fibril network to form a smooth bonding area. This may help the bonding of composites with fibrils or fibers.

To sum up, this study provided novel clay-starch composites and methods of making and using same. The composites of the present invention may be used as papermaking filler and the paper products manufactured using such clay-starch composites have much higher paper strength, comparing to paper made using untreated clay. The clay-starch composites could increase bonding strength dramatically as shown in the ZDT tests. Tensile, burst, and folding strength of the paper products manufactured using such clay-starch composites were improved up to more than about 100% at about 20-30% doses, compared to untreated pure clay. Optical properties were also increased as the composites amount in sheets increased. At same opacity and brightness, clay-starch composites filled handsheets have much higher tensile strength than unmodified clay filled sheets. The bonding of clay-starch composites with fibers was confirmed by SEM study. This technology could be very attractive for paper grades needing high filler loading and high physical strength.

Example 2

Materials

Kaolin clay was obtained from Dry Branch, Inc. and raw corn starch (B200) was obtained from Grain Process Inc., respectively. Ammonium sulfate (reagent grade, ≧99.0%) was obtained from Aldrich. Bleached kraft hardwood and softwood pulps were refined in a Valley beater to a freeness of 400 CSF, respectively. Equal proportions of the two pulps were mixed, which was used as the base pulp furnish for the handsheets. Percol-175 (medium-charge density, high molecular weight cationic poly-acrylamide retention aid) was obtained from Ciba Specialty Chemicals that was used only for retention of untreated clay. No retention aid was added if the clay-starch composites were used as the filler because of their relative large particle size and very high mechanical retention in the handsheets.

Preparation of Clay-starch Composites

Clay-starch composites were prepared following the method descried by Yoon and Deng (Yoon, S, and Deng, Y. Clay-starch composites and their application in papermaking. J. App. Polym. Sci. 2006, 100, 1032-1038). Briefly, dry clay was directly added to a 3% starch solution and the mixture was stirred until a good dispersion was obtained. The ratios of clay to starch were 1:1, 1:0.5, and 1:0.25, respectively. These clay-starch mixtures (10-15% total solid content) were cooked at 95° C. for 30 minutes. Cooked clay-starch solutions were poured into a 40% ammonium sulfate solution being stirred at 500 rpm. After 1 minute of stirring, the starch-clay composites were precipitated out. The resulting composites were collected using a filter paper, washed free of salt, and recollected. The final clay-starch composites were re-dispersed in water by mechanical stirring. The remaining ammonium sulfate solution, after filtration, may be recycled and reused.

Handsheet Preparation and Determination of Paper Physical Properties

The pulp was diluted to 0.5 wt % and various amounts of composites were used for handsheet making. After the addition of the composites, the slurry was stirred for 20 sec at 700 rpm. The handsheets with a target basis weight of 60 g/m² were produced according to TAPPI Test Method T 205 "Forming Handsheets for Physical Tests of Pulp." No retention aid was used during the handsheet preparation when the composites were used as fillers. For comparison, the control handsheets were prepared using untreated clay and a cationic retention aid (Percol-175, 0.05-0.1 wt % based on solid fiber weight). After two cycles of wet pressing, all handsheets were dried at 105° C. Physical properties of the paper were measured according to standard TAPPI methods. The filler content was determined by ashing the paper in a muffler oven according to standard Tappi method T211.

Specific Shear Bond Strength Measurement

Bond strength is defined as the average force to break a bond per unit area of a sample. Specific bond strength is defined as the force to break a bond per unit of optical surface area created by broken bonds. For a paper, the change in optical-contact area as a result of bond breakage usually may be calculated on the basis of the Kubelka Munk definition. However, the Kubelka Munk approach cannot be applied in this study because the light scattering coefficients of filler with fiber or starch are different so that optical contact area cannot be calculated.

In order to measure the specific shear bond strength between fiber and filler, the suspension of starch-coated filler was first vacuum filtered onto a membrane (Isopore™ polycarbonate membrane with an average pore size of 0.4 μm), generating a thin filler disk. The size of the filler disk is about 2×2 cm and the thickness is about 1 mm. This filler disk was carefully transferred onto a wet wood fine sheet (softwood:hardwood=1:1) made by gathering fines from the highly refined pulp and filtrating using the same vacuum membrane filtration method. Then a plastic ethylene film with the 2×2 mm square hole in the center was placed on the top of the filler disk and another wet wood fine sheet was laid above the film. The actual bonding area between fillers and fibers was fixed to be 2×2 mm through the film hole. After conditioning at 20° C. and relative humidity of 60%, both sides of a sample were fixed at the clamps in the Instron tensile tester. The tensile speed for the bond strength was set to the same as that for the sample testing. The procedure is schematically shown in FIG. 10.

For measuring the specific shear bond strength between fibers, the handsheets (basis weight 60 g/m²) made by TAPPI standard method were put on a plastic film with the same size of hole on the wet handsheet. On top of the film, the other wet handsheet was laid carefully.

Figure 10:
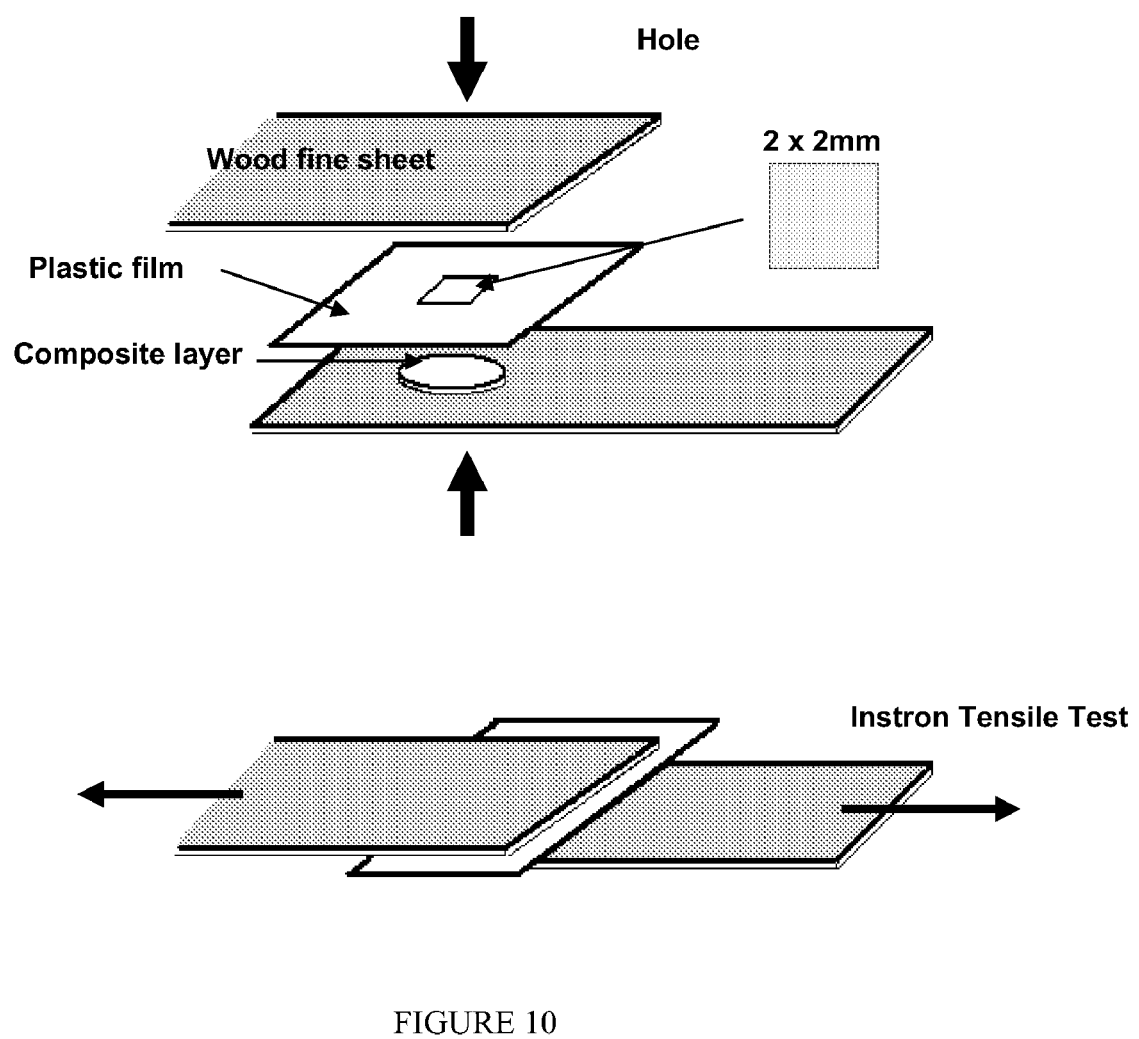
FIG. 10 shows a schematic representation of sample assembly and the tensile strength test in accordance with one embodiment of the present invention.
Figure 11:
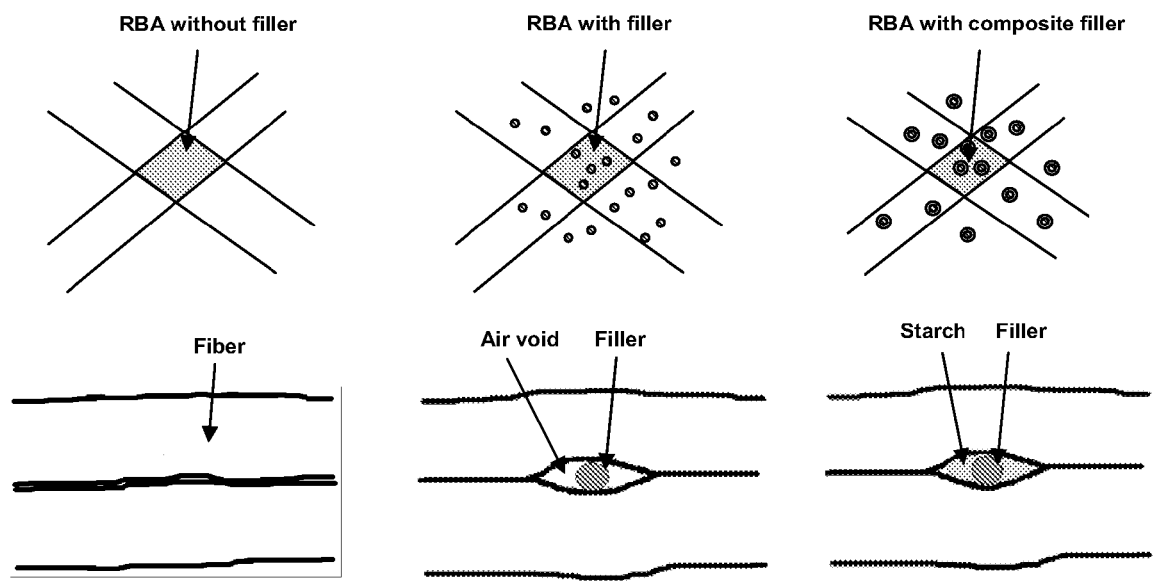
FIG. 11 shows a schematic representation of the relative bond area ("RBA") between two fibers in the absence and presence of filler particles in accordance with one embodiment of the present invention.

Two laminated sheets as shown in FIG. 10 were pressed under 90 psi at 105° C. for 10 minutes using a simultaneous pressing and heating machine (PID, National Instrument). After conditioning at 20° C. and relative humidity of 60%, the specific shear bond strength of the laminated sheet was tested by using an Instron tensile tester. It is assumed that the fillers and fibers were completely in contact because (a) the sheets were made by wood fines ion (200 mesh) rather than long fibers, which are less void presents; (2) composites were deformable which can contact the substrates at increased pressure and temperature.

Determination of Specific Surface Area for Tensile Strength Modeling

The specific surface area of pulp, clay, and modified clay were determined by the adsorption isotherms of $N_2$ at 77 K by using a Flowsorb II 2300 BET surface area analyzer. Because the starch-filler composites may form dense aggregates during drying resulting in a different surface area in BET measurement, the composite particles were freeze-dried overnight to maintain the original size and shape during/after drying. The samples were degassed at 150° C. for more than 20 min immediately prior to the adsorption measurements.

Tensile Strength Modeling

It was proposed that the delamination force of laminated sheets is proportional to the specific bond strength, b, and the relative bonded area, RBA. The original Page equation used the specific shear bond strength (b), which has no relationship with ZDT. However, it has been indicated in several refereed works that b×RBA is proportional to the internal bond strength such as delamination force, ZDT, and Scott bond strength. Therefore, the b×RBA term in Page equation could substituted by ZDT as following:

$$\frac{1}{T} = \frac{9}{8Z} + \frac{C}{b \times RBA} = \frac{9}{8Z} + \frac{D}{ZDT} \quad (6)$$

where C and D are constants.

Figure 12:
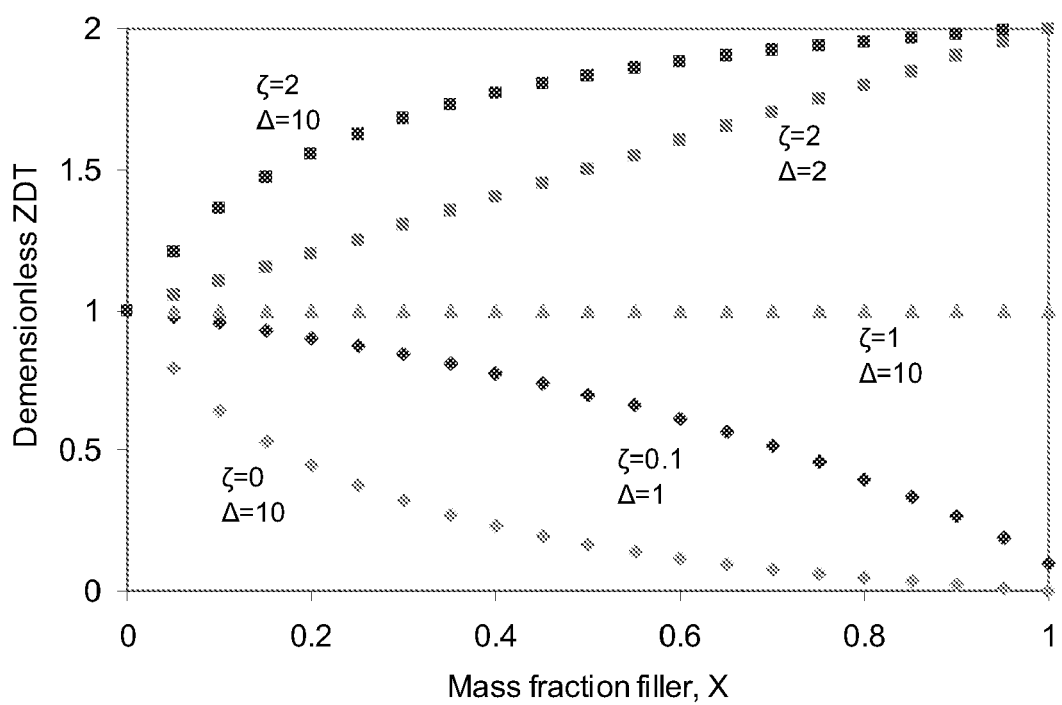
FIG. 12 shows calculated dimensionless ZDT as a function of filler mass fraction in accordance with one embodiment of the present invention. Curves were calculated from Equation 8 where $\zeta=b_c/b_f$, $\Delta=S_c/S_f$ and k=0.5.

Because RBA in Equation 6 is a constant for clay-starch composites filled sheets, it is included in the new constant D. Beazley et al. assumed that the relative bonded area, RBA, is the total bond area that includes filler-fiber and fiber-fiber and the RBA does not decrease by the filler addition because fibers still cross one over another in the same way as they would with no filler presents as shown in FIG. 12 (top) (Beazley, K. M., Dennison, S. R., Talyor, J. H. Influence of Mineral Fillers on Paper Strength: Its Mechanism and Practical Means of Modification. Preprints 11$^{th}$ ESPRA European Meeting, 1979; p 217). However, untreated fillers are incompressible providing micro voids between the fibers. On the contrary, for composite fillers, RBA can be assumed to be the same for the papers with and without fillers if handsheet making and drying conditions are the same because of completely contact between fillers and fibers, as shown in FIG. 12. Therefore, $$ZDT \propto b \cdot R.B.A. = \left[ \frac{kb_c x S_c}{kxS_c + (1-x)S_f} + \frac{b_f(1-x)S_f}{kxS_c + (1-x)S_f} \right] \cdot R.B.A. \quad (7)$$

Therefore, Equation 7 can be used to calculate the dimensionless force, $ZDT_{(dimensionless)}$:

$$ZDT_{(dimensionless)} = \frac{ZDT}{ZDT_{x=0}} = \left[ \frac{k\zeta x\Delta}{kx\Delta + (1-x)} + \frac{(1-x)}{kx\Delta + (1-x)} \right] \quad (8)$$

where $\zeta = b_c/b_f$ $\Delta = S_c/S_f$

Equation 8 can be rewritten as:

$$ZDT = ZDT_{x=o} \times \left[\frac{k\zeta x\Delta}{kx\Delta + (1-x)} + \frac{(1-x)}{kx\Delta + (1-x)}\right] \quad (9)$$

And Equation 1 could be rewritten as the follows after combining Equations 6 and 9:

$$\frac{1}{T} = \frac{9}{8Z} + \frac{E}{ZDT_{x=O} \times \left(\frac{k\zeta x\Delta}{kx\Delta + (1-x)} + \frac{(1-x)}{kx\Delta + (1-x)}\right)} \quad (10)$$

where E is a constant.

The constant E in Equation 10 can be calculated using Equation 6 because T (tensile strength, measurable), Z (zero span tensile strength (expressed zero span as breaking length) can be measured by using TAPPI test method T231 cm-96, and ZDT strength in the absence of filler may be obtained.

Because all parameters on the right side of Equation 10 are measurable, the tensile strength as a function of ZDT for the handsheets made with different fillers could be modeled. It should be noted that the bond strength is the function of sheet structure and the fiber properties. Therefore, Equation 10 may not be a reasonable approach if different pulps or conditions such as beating, pressing, drying are used. However, because all these conditions are the same for the handsheets made in this study, Equation 10 can be approximately used for modeling the paper properties for this study.

Stiffness Modeling from Modeled Tensile Strength

Not only the tensile strength but also the stiffness could be modeled for filler containing papers. The bending stiffness relates to modulus of elasticity and thickness of a uniform sample of any material via the following formula:

$$S = \frac{EI}{b} = \frac{Eh^3}{12} = A_0 h^3 \frac{\delta}{\varepsilon} \quad (11)$$

Where S: stiffness, E: modulus of elasticity, I: the momentum of inertia of the sample, h: thickness of the sample, $A_0$ is a constant, and b: the width of the sample. $\varepsilon$ and $\delta$ are the strain and stress of paper, respectively. It is known that the tensile strength of paper (T) is proportional to the elastic modulus of paper (E) and the elastic breaking strain of fibers ($\varepsilon_f$) by relationship of $T=E*\varepsilon_f$. In this study, because the fibers used for all papers are the same, $\varepsilon_f$ will be the same for all papers. Therefore, tensile strength T of the paper can represent the modulus E of the paper. In Equation 11, the elastic modulus of paper, E, was replaced with the maximum tensile stress $\delta'$, which equals to the paper tensile strength T. It is interesting to note that all the samples tested in this study have a similar strain at failure $\varepsilon'$ (the difference is <2% with a standard deviation of 0.19). Therefore, it is reasonable to assume $\varepsilon$ is a constant for all samples prepared in this study. With this approximation, Equation 11 can be written as:

$$S = \frac{Eh^3}{12} = A_0 h^3 \frac{\delta}{\varepsilon} \cong B_0 \frac{\delta'}{\varepsilon'} h^3 \cong C_0 \delta' h^3 \quad (12)$$

where, $A_0$, $B_0$ and $C_0$ are constants, $\delta'$ is the maximum stress at breakage (Nm/g), $\varepsilon'$ is the strain at failure. Equation 12 suggests that the stiffness S has a linear relationship with the stress at failure, or the tensile strength.

Among the bending stiffness test methods developed, Gurley and Taber stiffness are the most common for papermaking, and in many respects, Gurley method measures the same property as the Taber method (Verseput, H. W. Precision of the Taber Stiffness Test. *Tappi*. 1696, 52, 1136-1141). In this study, the Gurley stiffness was measured (TAPPI test method T 543 pm-84) for modeling study.

Specific Shear Bond Strength of Starch-Clay Composites with Wood Fibers and their Specific Surface Area FIG. 12 shows the dimensionless ZDT calculated using Equation 8 as a function of filler fraction in the handsheets with different ratios of filler-fiber specific bond strength ($\zeta = b_c/b_f$) and specific surface area ($\Delta = S_c/S_f$). When $\zeta$ is 0 or 0.1, which means the specific bond strength between filler and fiber does not exist or is very small, the dimensionless bond strength decreases as the filler ratio increases. These low values of $\zeta$ are typical for the papers made from unmodified inorganic fillers. However, when $\zeta = 1$, the specific bond strength of filler to fiber ($b_c$) equals to that of fiber to fiber ($b_f$), and the dimensionless bond strength remains constant even as the filler content increases. This might be applied to lumen loading or fine-filler mixtures. Moreover, if $\zeta$ is bigger than 1, when filler-fiber specific bond strength is higher than fiber-fiber strength such as some polymeric filler or starch modified filler are used in paper, the dimensionless bond strength increases as the filler loading increases because the filler could act as a bonding enhancing agent if $b_c > b_f$. If the fillers are preflocculated before adding to the pulp slurry, the ratio of specific surface area of filler to fiber ($\Delta = S_c/S_f$) decreases resulting in an increase in the dimensionless bond strength although the specific bond strength between filler and fiber ($\zeta = b_c/b_f$) does not change.

In order to verify the theoretical calculation results, the actual specific shear bond strength was determined by the method shown in FIG. 10. However, when the two handsheets are laminated and starch-clay composites (with a ratio of starch to clay of 0.5 to 1) were in between, the breakage always occurred between fiber-fiber rather than fiber-filler. This means that the bond strength between starch-clay composite and fiber is stronger than fiber-fiber bonding. It has been suggested that as a higher dosage of bonding agents, such as starch or CPAM, is treated on the fiber surfaces, the position of bond breakage shifts from fiber surfaces to the inside of the S1 layer and to the interface between the S1 and S2 interface. For these cases, it is impossible to directly measure the specific bond strength between starch-coated fillers and wood fiber using the method proposed in FIG. 10. To solve this issue, the inventors prepared stronger sheets using wood fines, which were vacuum-filtered on a membrane filter and wet-pressed under pressure of 70 psi. By using these "wood-fines papers," the specific bond strength between filler composite film and cellulose substrate could be measured. As shown in Table 1, the specific bond strength between filler and fine was increased from 0 to 11.2 $N/m^2 \times 10^6$ as the starch ratio increased from 0 to 1.

TABLE 1

Specific surface area of starch-clay composites
and their shear bond strength with wood fibers

| | starch/clay ratio | | | | Wood fiber (CSF 400 ml) |
|---|---|---|---|---|---|
| | 0 | 0.25 | 0.5 | 1 | |
| Specific Surface Area, m²/g | 16.7 | 15.5 | 15.2 | 13.9 | 1.5 |
| $S_c/S_f$ | 11 | 10.3 | 10.1 | 9.2 | — |
| Max. Load, N/m² × 10⁶ | 0 | 4.8 | 7.6 | 11.2 | 5.2 |
| $b_c/b_f$ | 0 | 0.9 | 1.4 | 2.1 | — |

It is well known that filler type can affect paper strength and structural properties, and the size of the filler is one of the most important factors affecting those properties. Moreover, if fillers are coated or treated with some bonding materials, the size of the filler would be changed and it becomes a critical matter affecting the paper's properties. As shown in FIG. 12, when the specific bond strength between the filler and wood fiber is identical (for example, $\zeta=1$), the surface area can remarkably affect the internal bond strength of the paper.

ZDT Modeling of Starch-clay Composite Filled Handsheets

Figure 13:
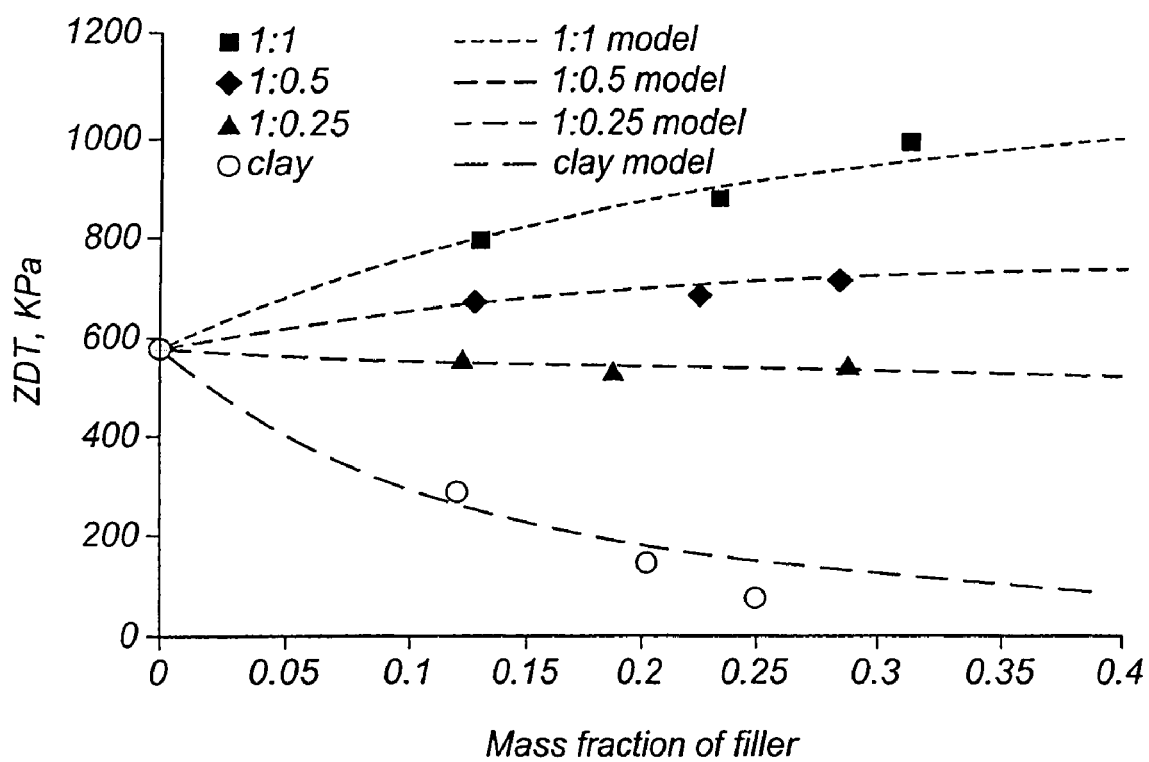
FIG. 13 shows calculation of ZDT based on modified Page Equation (Equation 5) and comparison of the calculated value with tested results in accordance with one embodiment of the present invention.

After the variables $\zeta$ and $\Delta$ from Table 1 were plugged into Equation 8, the ZDT values were calculated and compared with the experimental results. As shown in FIG. 13, the experimental results matched very well with the calculated ZDT of the handsheet. As expected, when the specific bond strength between fillers and fibers ($b_c$) was bigger than interfiber bonding ($b_f$), ZDT was increased as the composite filler dosage was increased. FIG. 13 also indicates that the model can be used for both untreated and modified clays.

Tensile Strength Modeling

Figure 14:
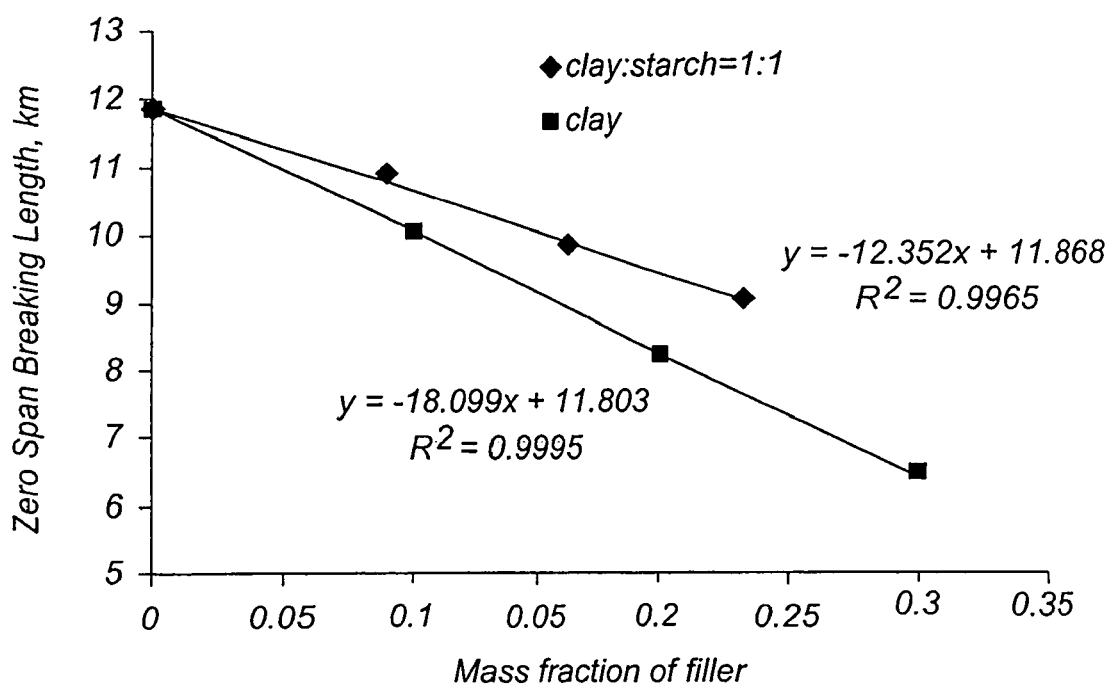
FIG. 14 shows zero span tensile strength as a function of filler content in paper in accordance with one embodiment of the present invention.

For tensile strength (expressed as breaking length) modeling, one of the variables shown in Equation 10 is the zero-span tensile strength (expressed as zero-span breaking length), Z, which can be experimentally measured using TAPPI standard method. FIG. 14 shows that as the filler amount increases, the zero-span tensile strength decreases because the fraction of long fiber in the handsheet decreases.

The constant E in Equation 10 could be calculated if the zero span tensile strength Z, tensile strength T, and ZDT values are known. In this study, these three parameters were directly measured. For a filler-free sheet, the constant E in Equation 10 was calculated to be 21.5 kPa. Therefore, Equation 10 can be rewritten as:

$$\frac{1}{T'} = \frac{9}{8(-18.1x + 11.803)} + \frac{21.5}{ZDT_{x=0} \times \left(\frac{k\zeta x\Delta}{kx\Delta + (1-x)} + \frac{(1-x)}{kx\Delta + (1-x)}\right)} \quad (13)$$

Figure 15:
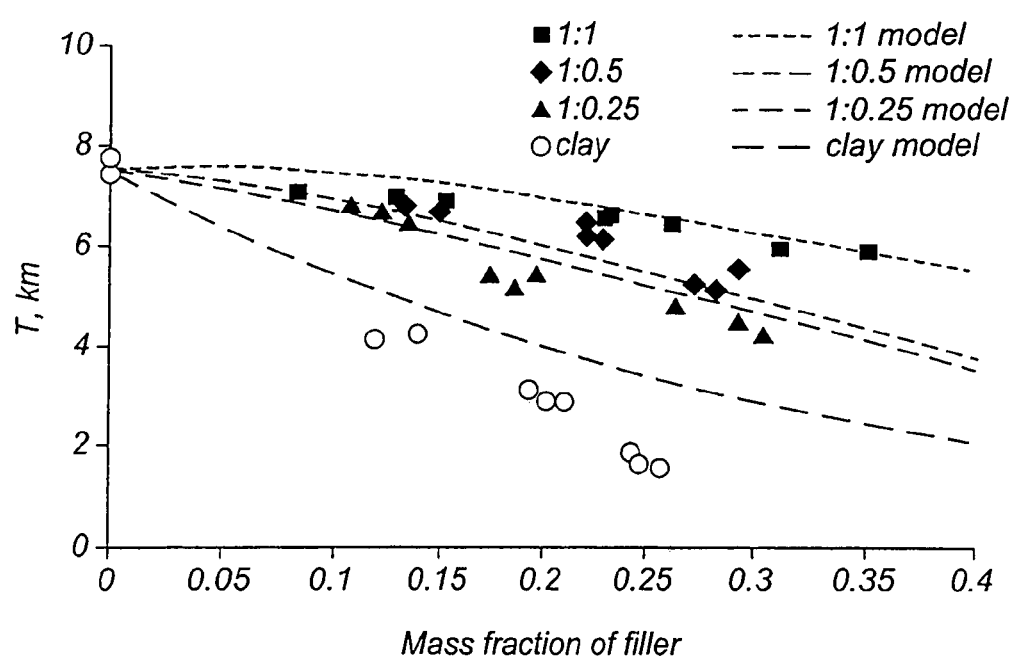
FIG. 15 shows experimental data (points) and modeling results (lines) of tensile strength as a function of filler dosage and starch to filler ratios in accordance with one embodiment of the present invention.

As shown in FIG. 15, both experimental and calculated results indicate that the tensile strength increased as the starch amount increased. Although the specific bond strength of filler-fibers ($b_c$) was double that of fiber-fiber ($b_f$), FIG. 15 indicates that the tensile strength gradually decreased as the starch-clay composite dosage increased. The reason for this difference may be because of the decrease of zero span tensile strength in the sheet as shown in FIG. 14.

It was noted from FIG. 15 that for the papers filled with starch modified fillers, the calculated curves match with the experimental data very well. However, if pure clay was used as the filler, the calculated tensile strength is higher than experimental results. One reason for this difference may be that a cationic polymeric retention aid (Percol 175) was used for improving the retention of pure clay on the paper sheets, but no retention aid was used for starch modified fillers because the relatively large size of modified fillers could be easily retained to fiber webs. It is well known that retention aid may cause fiber flocculation resulting in the reduction of paper formation. For the tensile model developed in this study, there is no consideration for the loss of strength due to fiber flocculation.

Figure 16:
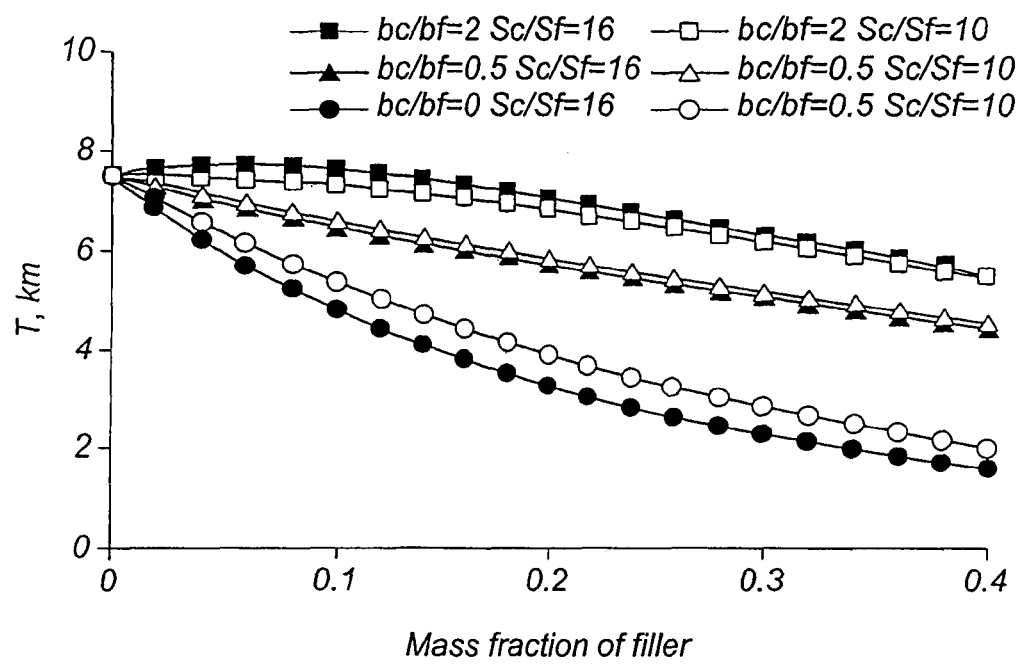
FIG. 16 shows calculated tensile strengths for different specific bond strength with different surface areas in accordance with one embodiment of the present invention.

According to Table 1, as the starch to clay ratio increased, the specific surface area decreased. FIG. 16 shows the calculated tensile strengths for different bond strengths with different surface areas. For the fillers with high specific bond strength ($b_c/b_f=2$), the change of surface area does not affect the tensile strength much. In contrast, the bond strength is thought to be a dominant factor for the tensile strength of paper loaded with modified fillers. For bonding enhancing fillers ($b_c>b_f$), the tensile strength increases as the surface area increases. However, for pure clay filler, the tensile strength decreases as the surface area increases as shown in FIG. 16.

Figure 17:
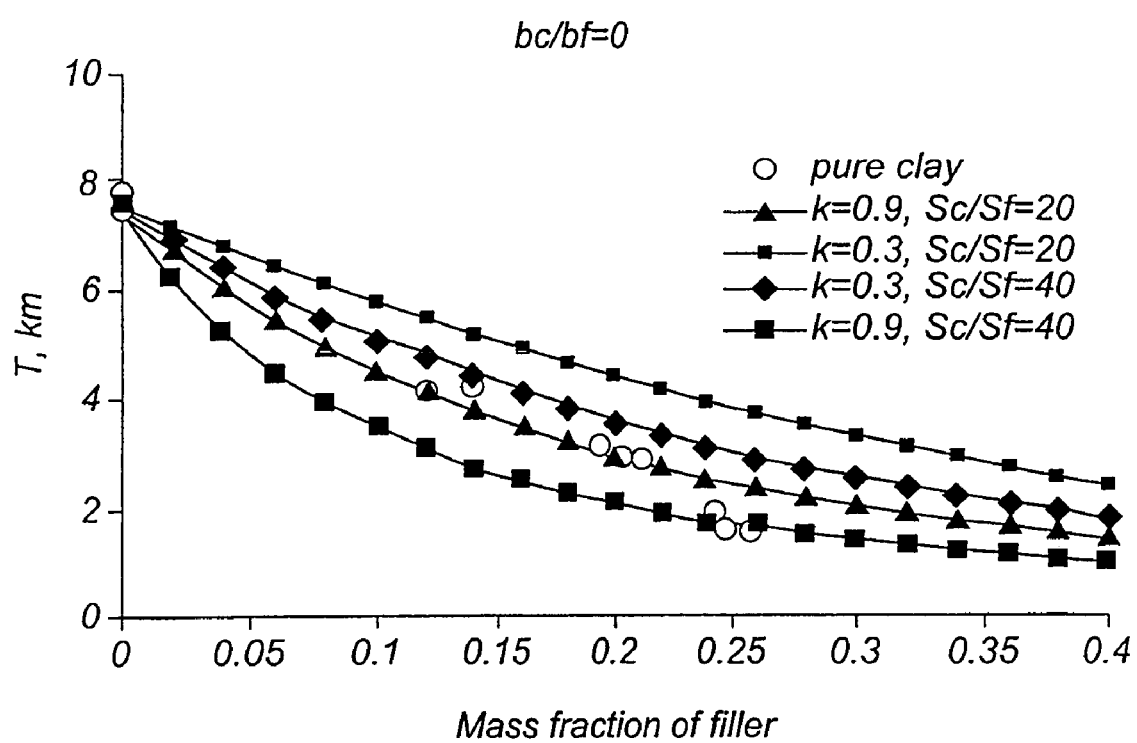
FIG. 17 shows the effects of changing k and $S_c/S_f$ values on the theoretical tensile strength in accordance with one embodiment of the present invention.

The k value in Equation 10 represents the filler fraction between two contacted fibers, which strongly depends on the filler distribution in the sheets. If filler particles are located inside the contacted fibers, k increases. However, if fillers are located in the voids in a sheet, they have no contribution to k value. As shown in FIG. 17, for pure fillers with $b_c/b_f$ equaling to zero (no bonding between fillers and fibers), the tensile strength decreases as the k value changes from 0.3 to 0.9.

Stiffness Modeling

Figure 18:
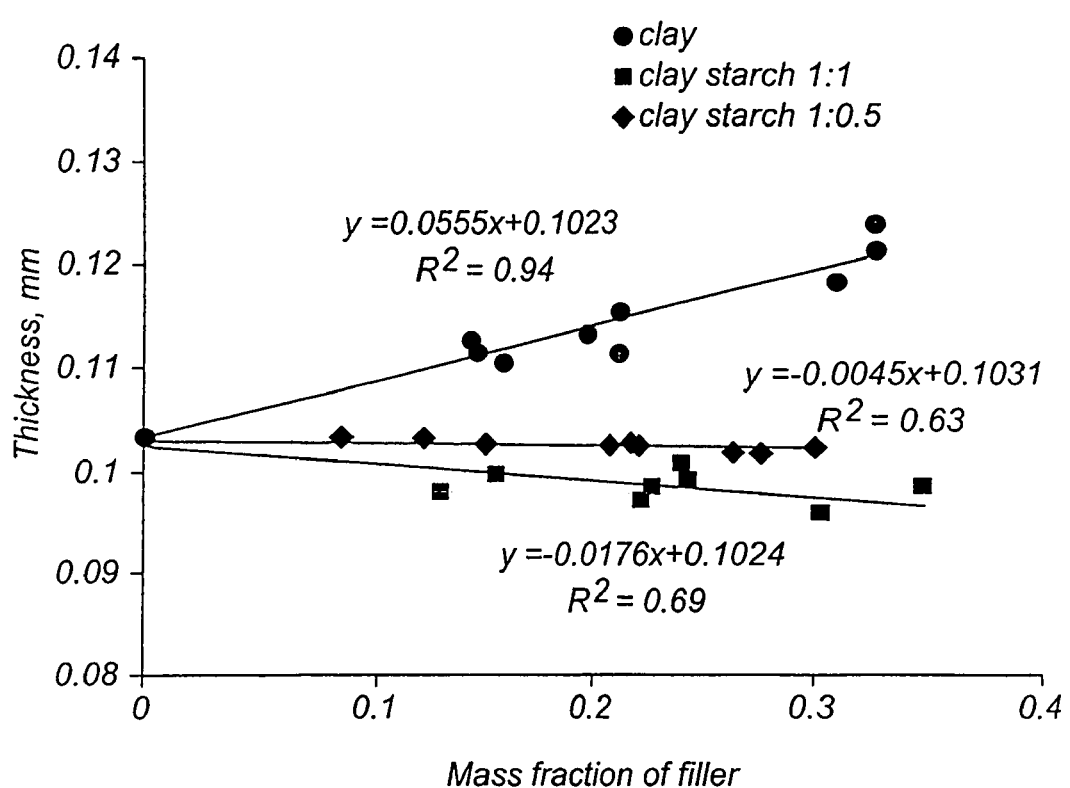
FIG. 18 shows the effects of changing clay and composite dosages on thickness of paper product in accordance with one embodiment of the present invention.
Figure 19:
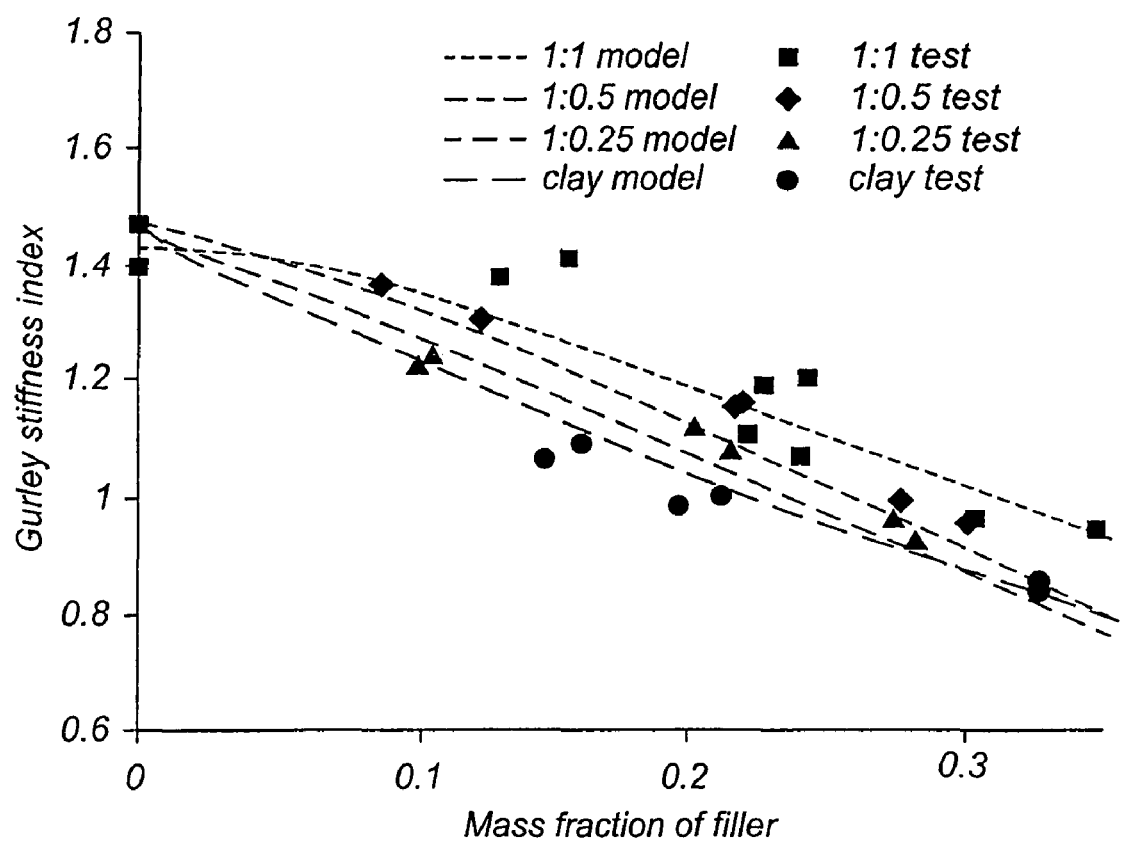
FIG. 19 shows the effects of changing starch to filler ratios and filler dosage on the stiffness property in accordance with one embodiment of the present invention.

The stiffness of the paper sheets was modeled using Equation 12. The best fitting constant, $C_0$, was found to be $1.803 \times 10^{10}$ (the unit is the reciprocal of Gurley stiffness), which was calculated by using known tensile index and thickness of paper when the filler content was zero. As the composite filler content changes, the thickness of paper also changes. Clay-starch composites are denser materials than wood fibers so that it is evident that the thickness of composites filled sheet was lower than unfilled. It is also discovered by the inventors that the higher starch ratio of composites, the less thickness was achieved as shown in FIG. 18. However, for untreated clay, the thickness of paper slightly increased as the clay content increased. This tendency might be caused by untreated fillers act as de-bonders which prevented the consolidation of the sheet. Another possible reason for the tendency may be the flocculation of fiber and clay due to the bridging mechanism of cationic polymer so that local mass distribution is not even.

Figure 20:
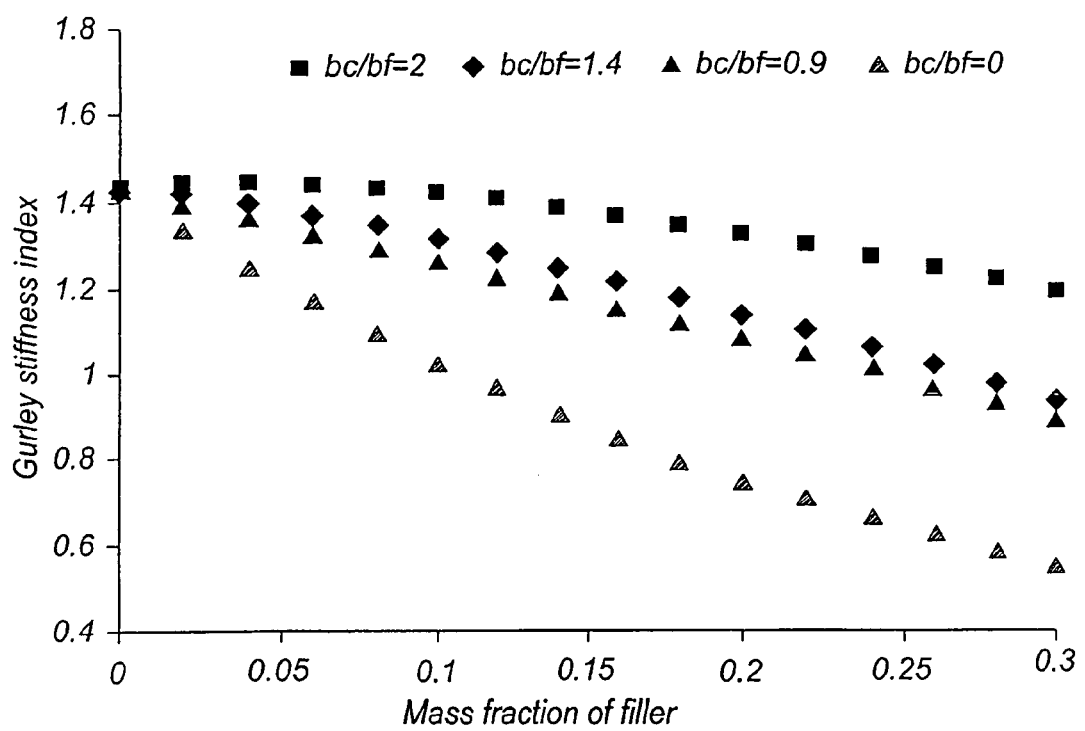
FIG. 20 shows the effects of specific bond strength on stiffness (assuming thickness is constant) in accordance with one embodiment of the present invention.

The model stiffness was plotted by using calculated tensile strength and thickness using Equation 12. The results indicate that the stiffness decreases as the filler amount increases for all cases including starch modified fillers. It is well known that the paper stiffness is a function of both the paper thickness (bulk) and internal bonding. The increased bond area using starch-coated fillers results in a decrease in the paper thickness as shown in FIG. 18. Therefore, as the most dominant factor of thickness was decreased, the stiffness was decreased. This is further confirmed by plotting the stiffness as a function of the specific bond strength with a constant thickness. As shown in FIG. 20, the stiffness will increase with the bonding strength between fibers and fillers if the bulk remains constant.

To sum up, this study provided a prediction method to study the tensile strength of filled paper with different filler-fiber bonding characteristics. This method in conjunction with modified Page's tensile strength equation allows one to calculate the paper tensile strength from the knowledge of specific bond strength between filler and fiber as well as filler surface area. It was determined that as the starch amount on modified filler increased, the specific bond strength between the wood fiber and filler increased. It was also found that the contribution in the strength improvement by increasing the specific bond strength between filler-fiber is more important than increasing the size of the filler aggregates. The stiffness of paper was modeled using the calculated tensile strength. Even though the thickness of the paper decreases as the starch amount increases, the stiffness of paper filled with starch-clay composite is higher than that with untreated filled papers. One of the reasons for this may be the increase in bond strength between fillers and fibers, which was confirmed by the stiffness modeling.

Example 3

In this study, the precipitation of starch was carried out through the formation of water-insoluble starch-fatty acid complexes in the presence of clay particles. It has been reported that amylose could be precipitated by fatty acids in a microcrystalline condition. The mechanism of the complex formation between the starch and fatty acid was once thought to be the formation of ester linkages but it is now believed that unbranched polar compounds, e.g., fatty acids and their monoglycerides, form helical inclusion complexes with amylose under suitable conditions. These complexes are considered to be similar to the blue polyiodide complex of amylose. The complexed molecule is thought to occupy the central axis of a helix consisting of 6, 7, or 8 glucosyl residues per turn, with a repeat spacing of 0.8 nm and internal cavity is considered to be a hydrophobic tube. The hydrophobic group of complexing agents can lie within the amylose helix and is stabilized by Van der Waal contacts with adjacent C-hydrogens of amlyose, while hydrophilic portions of the ligands are outside the helix. Further insertion of the fatty acid leads to steric conflicts because the steric and electrostatic repulsions prohibit the polar group from entering the cavity.

In this study, different aggregates of clay-starch composites were prepared and characterized. The effects of clay-starch composites on paper properties were also investigated. Compared to traditional approaches, relatively larger starch ratio in clay-starch composites was used because of the simple operation process and the low solubility of starch prepared in this study.

Materials

Calcined kaolin clay was obtained from Dry Branch Kaolin Co., Inc. (Dry Branch, Ga.). Raw corn starch was used for this experiment. Palmitic acid was obtained from Aldrich. Bleached hardwood and softwood pulps were each refined in a Valley beater to a freeness of 400 CSF. Equal proportions of the two pulps were mixed, and the mixture was used as the base pulp furnish for the handsheets. Cationic polyacrylamide (Percol-175) for filler retention was obtained from Ciba Specialty Chemicals. Cationic starch (STA-LOK 400) for filler retention and dry-strength was procured from Tate & Lyle Ltd (Decatur, Ill.).

Preparation of Clay-starch Composites

The composite with clay to starch ratio of 1:1 was prepared as the following: 5 g of clay was added to 3% uncooked raw corn starch suspension that contained 5 g of dry weight starch. The mixture then was stirred and cooked at 95° C. for 30 minutes. 0.5 g of palmitic acid was added to cooked starch-clay suspension and the mixture was then adjusted to pH 11 using 0.01 M KOH. After stirring for 10 minutes, the cooked clay-starch mixture was poured into 0.01 M HCl solution to neutralize it. The complex was then precipitated by adding a few drops of 2 M HCl to adjust pH of the mixture to pH 5 with 200 rpm stirring speed. The resultant composites were directly used for handsheet making. Two different palmitic acid ratios (10% and 30%) based on the solid starch were compared.

Characterization of Clay-starch Composites by Starch-fatty Acid Complex

The morphology and surface analysis was performed by using SEM. Swelling and solubility of starch measured at different temperatures were determined using the method described, supra. For the solubility measurement of starch, the wet clay-starch composite (2 g) collected after filtration and washing was agitated in 50 g of distilled water for 30 minutes at various temperatures. The suspension was cooled to 20° C., poured into pre-weighed centrifuge tubes, and centrifuged at 3000 rpm for 10 minutes. The supernatants containing dissolved starch were gathered and tested by measuring total organic content (TOC) using Shimadzu Total Organic Analyzer 5050. After the supernatants were removed thoroughly, the remaining sediments were weighed to determine swelling power. The weighed sediments were dried in vacuum dryer for 24 hours. The swelling power was obtained from weighing sediments before and after drying. The solubility and the swelling power were defined as following:

$$\text{Water solubility}(\%) = \frac{\text{wt. of initial dry starch} - \text{wt. of dry starch not dissolved}}{\text{wt. of initial dry starch}} * 100$$

$$\text{Swelling power} = \frac{\text{wt. of wet starch after centrifuge}}{\text{wt. of starch after drying}}$$

In order to characterize the structure of the starch-fatty acid complex, X-ray diffraction was analyzed as following: Powdered samples (pulverized to pass 150 mess) were equilibrated at 23° C. and 45% relative humidity for 2 days prior to analysis. X-ray diffractometer (PW 1800, Philips Co. Ltd., USA) was operated at 40 kV, 30 mA. Diffractograms were obtained from 10° 2θ to 40° 2θ with a scanning speed of 0.04°/second and scanning step of 0.05° 2θ.

The measurement of composite size was performed using a commercially available canning laser microscope (Lasentec Corporation, Redmond, Wash., USA). The effect of pH and shear force on composite formation was investigated from measuring the composite size using this technique.

The real time particle size using the focused beam reflectance measurement (FBRM, Lasentec Corporation, Redmond, Wash., USA) was measured to study the effect of pH or shear force on the clay-starch composite size change during the preparation. The detail mechanism and operation method of FBRM is described elsewhere (Yonn, S, and Deng, Y. J. Colloid & Interf. Sci. 278:139, 2004).

Handsheet Preparation and Determination of Paper Properties

Bleached hardwood and softwood pulps were each refined in a Valley beater to a freeness of 400 CSF. Equal proportions of the two pulps were mixed, and the mixture was used as the base pulp furnish for the handsheets.

The pulp was diluted to 0.5 wt % and various amounts of the composite aggregates were added during the handsheet formation. After the addition of the composites, the slurry was stirred for 20 sec at 700 rpm without adding any retention aids. Handsheets with a target basis weight of 60 g/m² were prepared according to TAPPI Test Method T 205 "Forming Handsheets for Physical Tests of Pulp." The control handsheets were prepared using unmodified clay with 0.05-0.1 wt % cationic polyacrylamide (CPAM) retention aid (based on dry fiber weight). For comparison of the composite with conventional wet-end system, the cationic starch was cooked at 90° C. for 2 hour, then directly added into the pulp slurry during the handsheet formation. After wet pressing twice at 50 psi for 5 and 2 minutes respectively, all handsheets were dried at 105° C. for 7 minutes on the Emerson Speed Dryer (Model 130). The physical properties of the paper were measured according to the standard TAPPI methods T220, T494, and T541. Ten measurements were performed, and the data were averaged for each strength value. The filler content was determined by ashing the paper in a muffler oven according to the standard TAPPI method T211. The contact angle was measured using First Ten Angstroms 32 contact angle analyzer (Portsmouth, Va.) equipped with a precise stepper motor driven syringe pump and a video camera. The wettability of handsheets was calculated by TAPPI method T458:

Rate of change of wettability($R$)=Change of contact angle/change of time

Starch-fatty Acid Complex Formation

Figure 21:
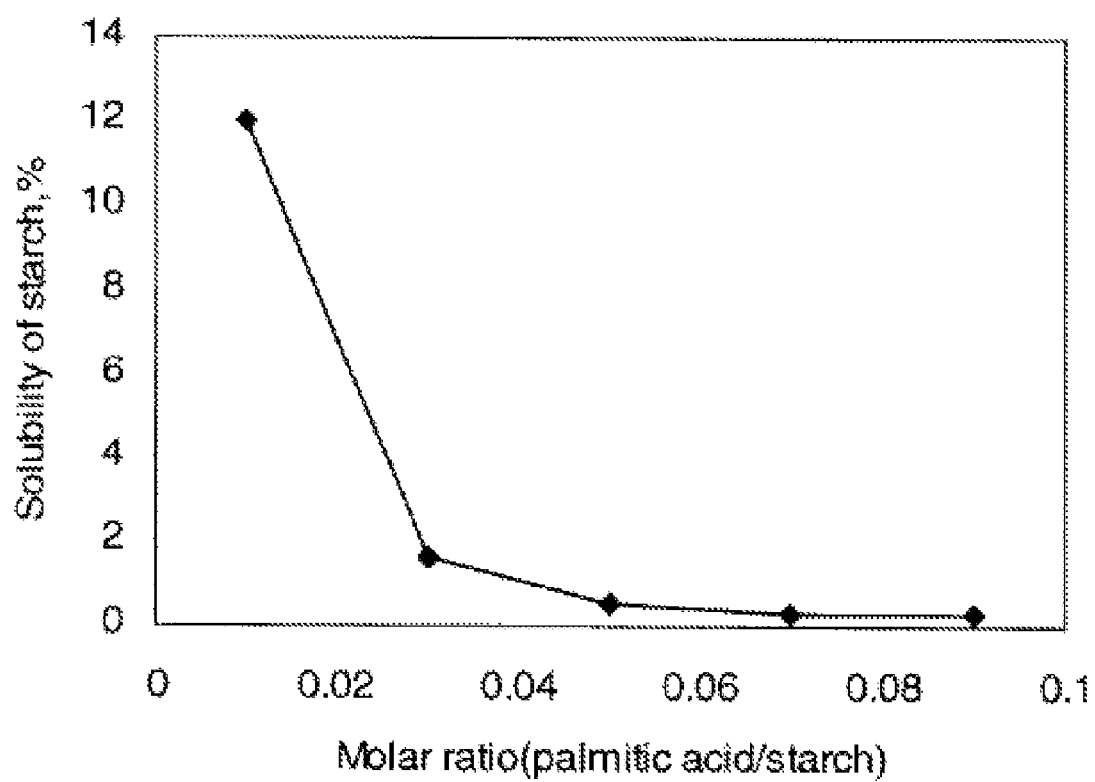
FIG. 21 shows the effects of changing molar ratios of palmitic acid to starch on the amount of soluble start in the reaction mixture in accordance with one embodiment of the present invention.
Figure 22:
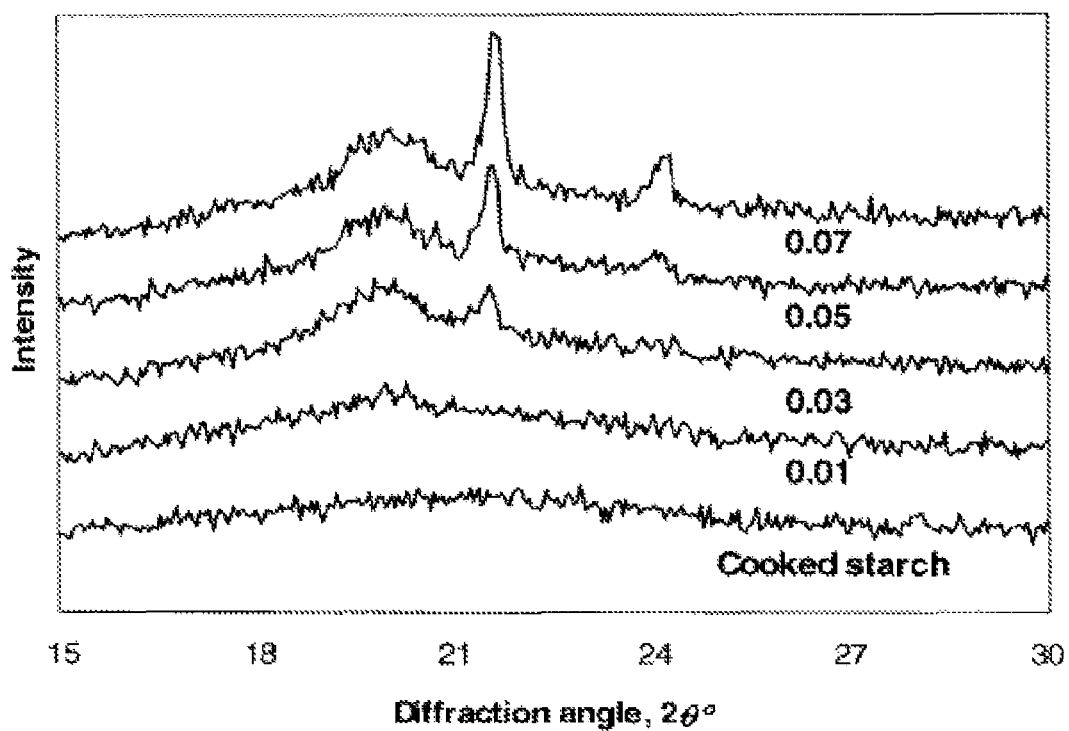
FIG. 22 shows the results of X-ray diffraction analysis of starch-palmitic acid complexes at different ratios of palmitic acid to starch in the reaction mixture in accordance with one embodiment of the present invention.

In order to investigate the complex formation and the coating efficiency of starch-clay composites, the starch and palmitic acid mixture at different ratios without adding clay were first investigated. The cooked starch and palmitic acid were mixed at pH 11 then neutralizing to pH 5 to form water-insoluble complexes. After separation of the insoluble complex by sedimentation, the amount of the starch left in the supernatant was analyzed by using TOC, and the results are shown in FIG. 21, which shows that the soluble starch amount dramatically decreased as the molar ratio of palmitic acid to starch increased. At molar ratios of greater than about 0.07, the soluble starch amount was less than 0.3%, which means almost >99% of starch was precipitated. The effect of the fatty acid ratio on the formation of the complex formation was also investigated using X-ray diffraction. X-ray diffraction scans of starch-fatty acid complexes at different palmitic acid ratios are shown in FIG. 22. The spectrum indicated a maximum at $2\theta=19.8°$, which became apparent when the palmitic acid to starch ratio is greater than 0.3. The maximum at $2\theta=19.8°$ presents V-type inclusion complexes of amylose. In contrast with the starch-fatty acid complex, only the amorphous structure without any crystalline peaks was observed for pure cooked starch. Therefore, the reduction of solubility of starch may be caused by the crystalline structure of starch-fatty acid complex. As the fatty acid ratio increased to above 0.3, two peaks at 21.4° and 23.8° were also observed. These peaks reflect the presence of a pure crystalline fatty acid.

Starch-fatty Acid-clay Composite Formation

The clay-starch composite was prepared by precipitation of starch-fatty acid complexes on the clay surfaces. In the experiments, required amounts of clay, starch, and palmitic acid were mixed and cooked together at pH 11. The cooked mixture (about 6.5% total solid concentration) was then poured into 0.01 M HCl solution (the same volume as the cooked mixture) to be neutralized while stirring at 200 rpm. As soon as the shear forces were stopped, white composites were formed quickly (e.g., within 20 seconds) and precipitated out from the solution. The solubility of this coated starch in water at papermaking conditions may be a critical issue for its application. If the solubility of coated starch in water is high, the structure of composite may be disrupted and the clays in composite aggregates may be separated to individual particles. Furthermore, high solubility of starch complex may cause many operational problems during papermaking process. Therefore, the solubility of precipitated starch in water at different temperatures was studied and the results are given in FIG. 23.

Figure 23:
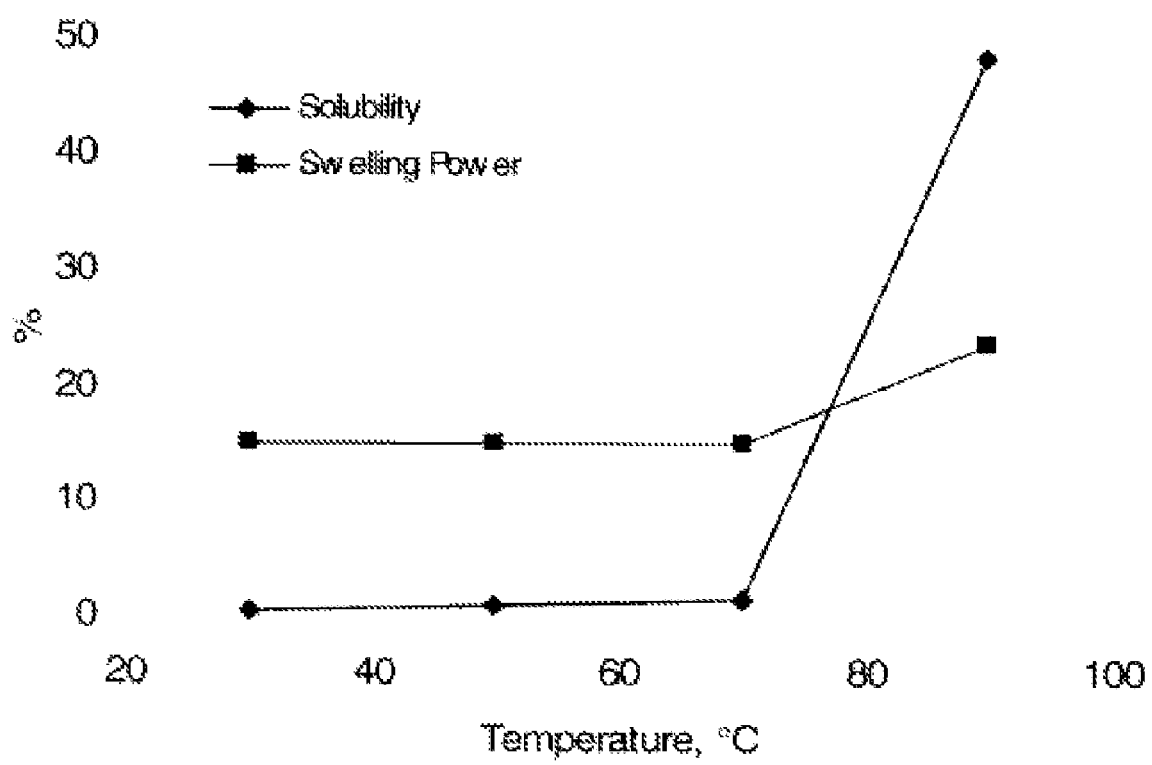
FIG. 23 shows the solubility and swelling behavior of clay-starch composites as a function of temperature in accordance with one embodiment of the present invention.

FIG. 23 shows the solubility and swelling behavior of clay-starch composites as a function of temperature. The measurements indicated that the solubility of the composites below about 70° C. was very low. However, the solubility was sharply increased above about 70° C., and almost 50% of starch composite was dissolved at 90° C. The high solubility of the complex above 70° C. may relate to starch's gelation temperature. It is well known that starch molecules usually undergo a remarkable conformation charge at the gelation temperature. Because of this dramatic change, the bonding between starch and fatty acid molecules may be damaged or weakened so they are no longer able to be in the form of complexes. After determining the solubility at each point, the composites were centrifuged and freeze-dried to investigate the change of crystal structures. X-ray diffraction results indicated that the peak intensities for V-type inclusion complex ($2\theta=19.7°$) and the fatty acid crystal ($2\theta=21.4°$ and $23.8°$) decreased at the temperature above 70° C. Another possible reason for the sharp increase in the starch-fatty acid solubility and decrease in crystalline peaks may be that the parts of the fatty acid combined with the starch may be leached out from the helical structure of starch over 70° C. and then the crystalline structures were disrupted. The volume change of coated starch was determined by swelling power. It has been reported that the swelling power of starch-clay composites without fatty acids increased as the temperature increased. However, the swelling power of starch-fatty acid-clay composites did not undergo substantial changes at all conditions studied. The low swelling ratio of starch-fatty acid complex relative to pure starch might be caused by the hydrophobicity of the fatty acids.

Figure 24:
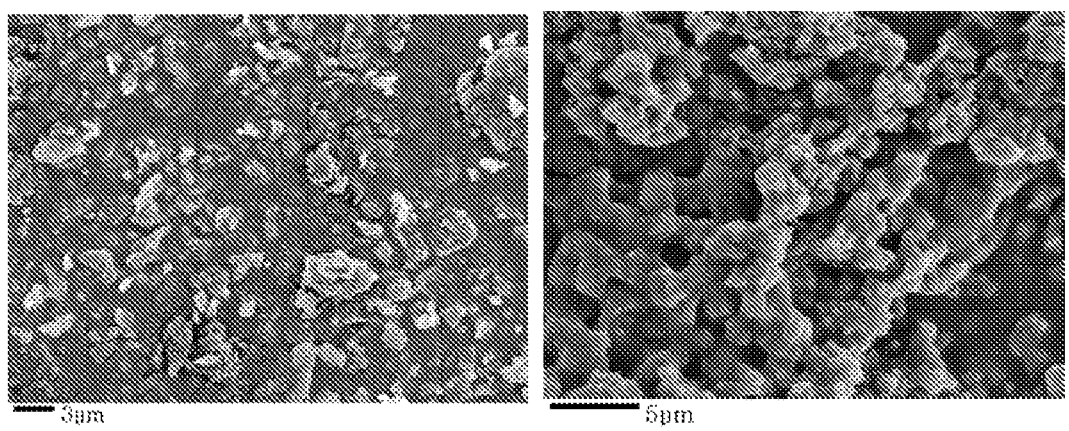
FIG. 24 shows representative SEM images of unmodified clay (left) and clay-starch composites (right) in accordance with one embodiment of the present invention.
Figure 25:
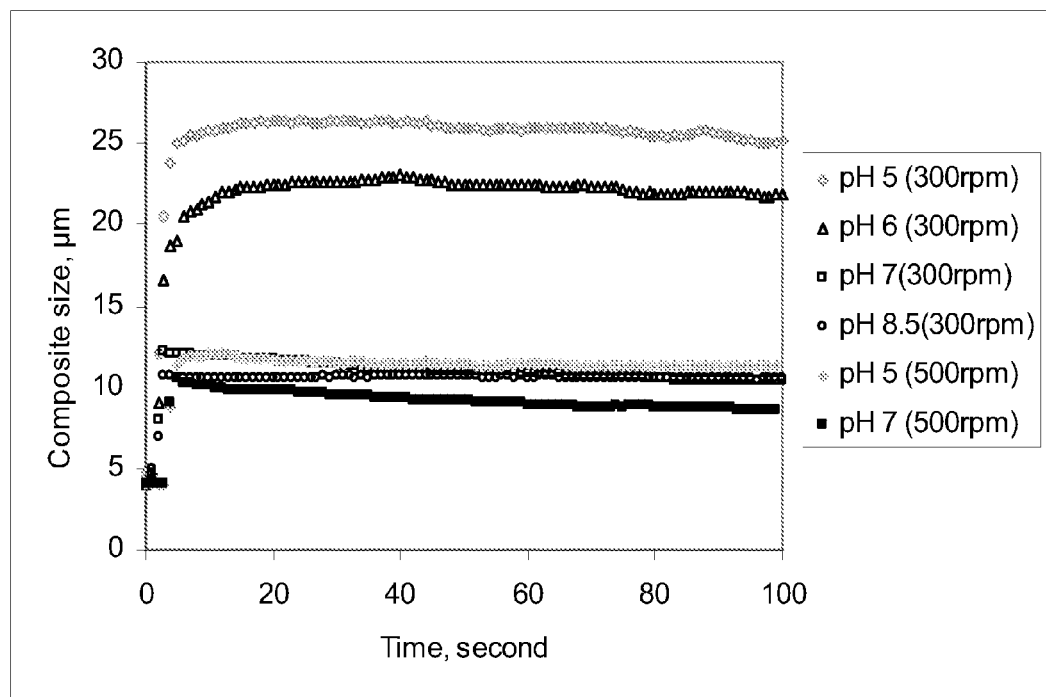
FIG. 25 shows the effects of reaction time and the pH of the reaction mixture on composite size (mean chord length) in the reaction mixture in accordance with one embodiment of the present invention.

It has been known that the particle size and shape of filler have a direct relationship with the physical properties of paper. Therefore, it is important to investigate the particle morphology for understanding the properties of the filled paper. FIG. 24 shows SEM images of clay-starch composites produced following the method of the present invention. It was found that the starch-fatty acid complex could perfectly or effectively coat the clay surface and form aggregates which are much bigger than pure clay. The aggregate size is not only the function of starch and fatty acid concentration, but also a function of a number of other factors, e.g., the total solid concentration, stirring rate and time, ratio of starch to clay, and pH. For example, as shearing force or pH increased during composite formation, the size of composite aggregates decreased as shown FIG. 25. It was found from the real time particle size measurement using FBRM that the mixture of clay with starch and fatty acid could not form aggregates effectively at pH 7 or values of higher.

The Effects of Clay-starch Composites on Paper Strength and Optical Properties

Figure 26:
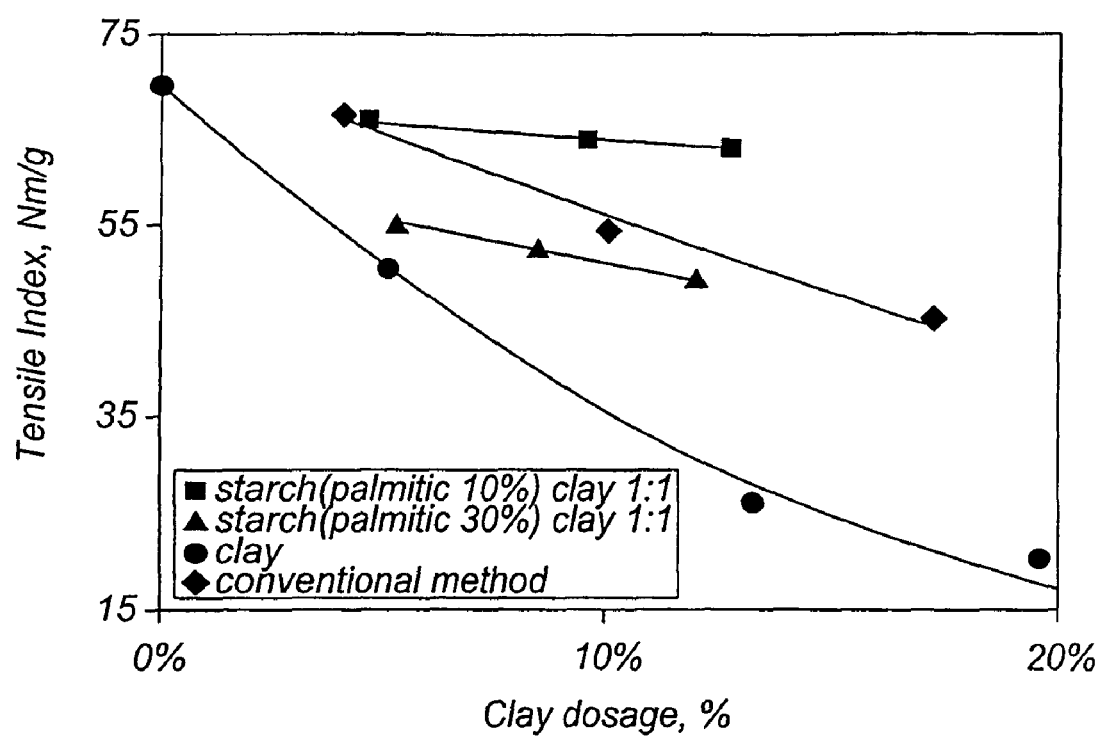
FIG. 26 shows tensile strengths of handsheets as a function of filler dosage in accordance with one embodiment of the present invention.

FIG. 26 shows the effects of clay-starch composites with two different palmitic acid ratios on paper physical properties. This result indicates that starch-fatty acid-clay composites could significantly improve paper strength properties compared to the pure clay. As the content of unmodified clay increased, the tensile strength of the handsheet made from unmodified clay decreased significantly because the clay particles in the handsheet interfere with the fiber bonding, which reduces the number of inter-fiber bonds. As shown in FIG. 26, the tensile strengths of the handsheets made from two clay-starch composites improved about 100-200% compared to the original unmodified clay at an about 15% clay addition. As the palmitic acid content increased from 10% to 30% based on the starch solid weight, the tensile strength decreased. This result indicated that the increased hydrophobicity due to fatty acids may interfere with hydrogen bond formation between starch and fibers.

To compare the handsheets using clay-starch-fatty acid composites as filler with that using regular filler, the cooked cationic starch (0.1% solution) was used as a wet end additive for unmodified filler. To match the total starch amount in the composite, the same amount of cationic starch with the clay amount in the paper was added. For example, at 10% clay dosage, 10% of cationic starch based on total solid weight of the handsheet was added. It should be noted that this starch amount is much higher than the amount of cationic starch used in most papermaking processes. When the cationic starch was added at 1-3 wt %, large fiber flocs were formed. However, when the starch amount went up to 10 wt %, fibers were well re-dispersed and fiber flocs were not distinguished in the slurry, and the handsheets was formed normally. Although the fibers could be well dispersed with very high starch addition, the drainage rate was very slow. In real papermaking condition, this large amount of cationic starch can not be used because of price, slime or pitch problems, and charge reversion. The reason for using this high starch content in this study is to test the approach of the present invention under an extreme condition. Although the actual starch retention on the paper sheet was not measured, the inventors expect that it is much higher than the starch amount retained on paper sheet in a regular papermaking process. The result from this conventional wet-end addition method showed the tensile strength was much better than pure clay filler, but it had a lower tensile strength than the composite method (10% fatty acid). Because the starch was coated on the filler surface, both the starch retention and water drainage were very high. Therefore, one of the significant advantages of this starch-clay composite approach is that very high starch content can be used for paper physical property improvement without starch retention problems.

Figure 27:
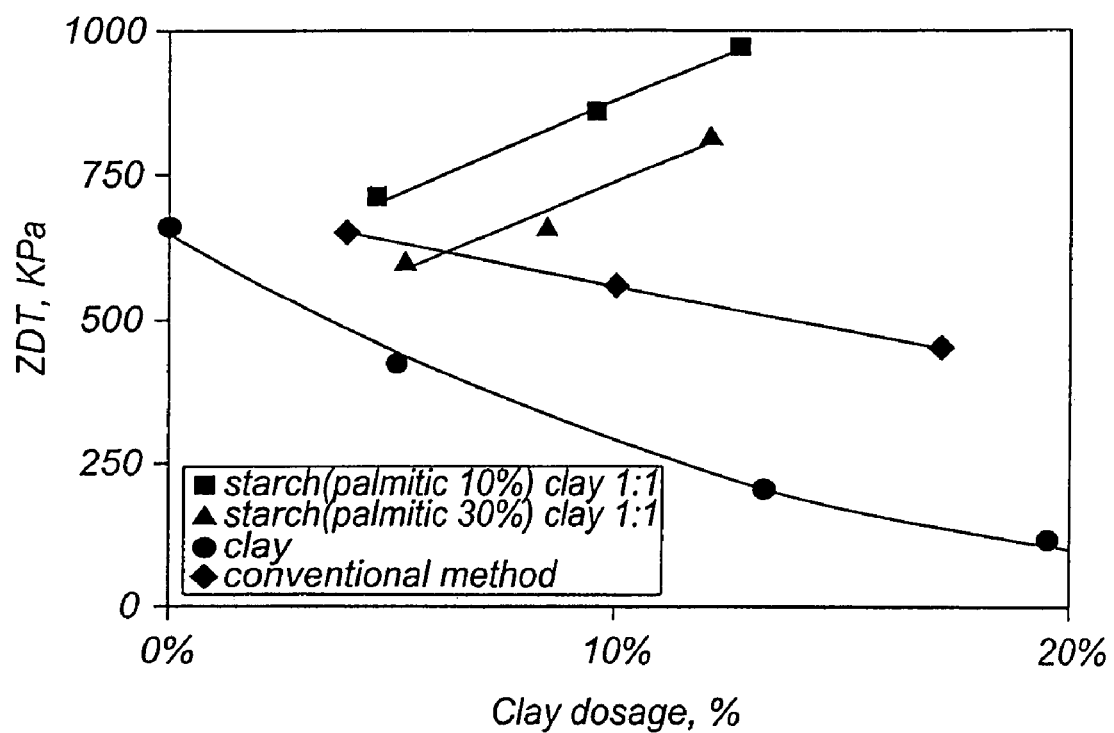
FIG. 27 shows the effects of clay-starch composites on ZDT strength of the handsheets produced in accordance with one embodiment of the present invention.

FIG. 27 shows the results of z-direction tensile strengths of clay-starch composite filled sheets. It is well known that the ZDT usually decreases as the filler content in the paper sheet is increased because filler interferes the fiber-fiber bonding. However, surprisingly, the ZDT increased as the composite content increased in the handsheets made from clay-starch composites with a ratio of clay to starch of 1:1. The result from the conventional wet-end method using cationic starch showed that as the clay amount increased, the ZDT decreased. Other physical properties such as burst and folding strength were also significantly improved about 200-300%. The main reason for this significant improvement may be an increase in bonding strength between wood fiber and clay-starch composite filler as shown in the ZDT test.

Figure 28:
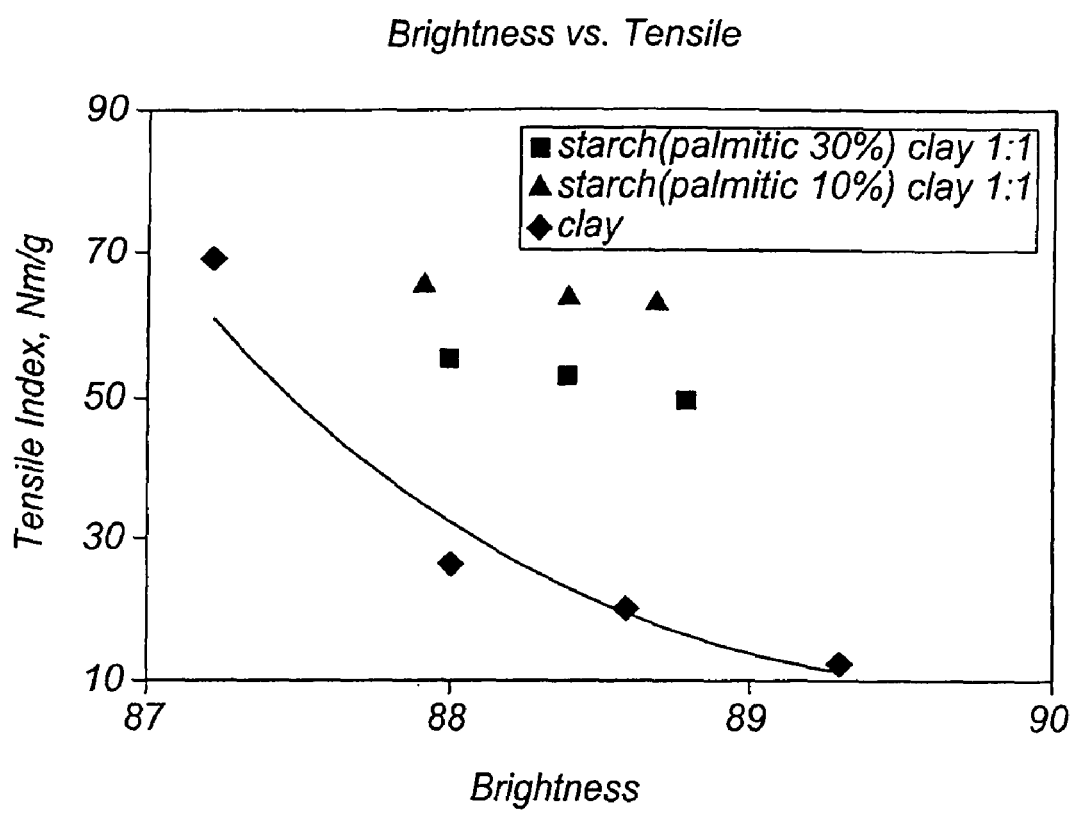
FIG. 28 shows the effects of clay-starch composites on brightness of the handsheets produced in accordance with one embodiment of the present invention.

FIG. 28 shows the brightness of the handsheets made with pure clay and clay-starch composites. At the same tensile strength, the brightness of handsheets filled with the clay-starch composite was much higher than that of pure clay because much higher filler content was in the handsheet made from composite. This result suggests that, at the same paper tensile strength, the brightness of the paper may be improved by using starch-fatty acid-clay composites.

Figure 29:
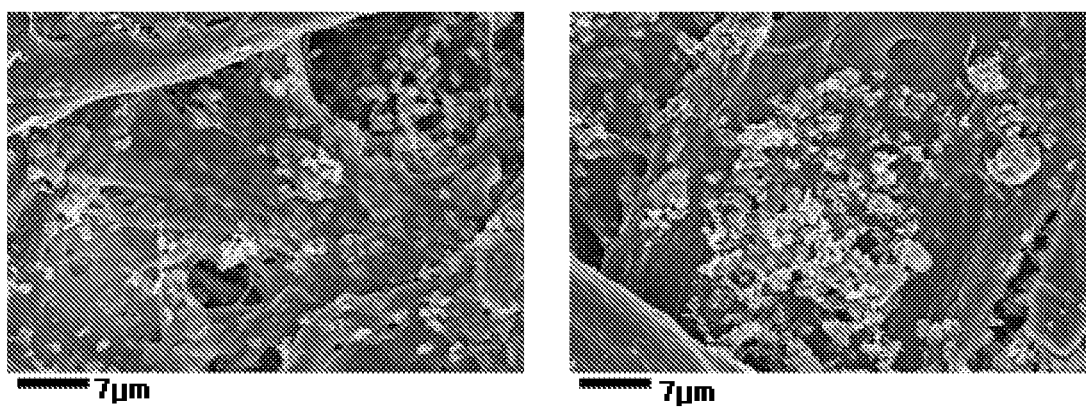
FIG. 29 shows representative SEM images of clay-starch composite filled handsheets produced in accordance with one embodiment of the present invention. Left: 10% palmitic acid; right: 30% palmitic acid.

In order to investigate the bonding between the wood fibers and composites and uniformly distribute composites on the paper, the surface of the handsheets filled with composites was observed by using SEM, as shown in FIG. 29. All clay-starch composites were stuck on the wood fiber surface and no individual clay particles were observed. The SEM images also show that the thin starch film was spread over both filler particles and fibers. This starch film may enhance the bonding strength of the handsheet. It is believed that the starch-film was formed during drying at 105° C.

It is also shown that the clay-starch composites with 10% fatty acid addition were distributed uniformly on the handsheets compared to the clay-starch composites with 30% fatty acid. This result resembles the brightness test result, i.e., the handsheets made from clay-starch composites with 10% fatty acid have higher brightness values than those with 30% fatty acid.

Figure 30:
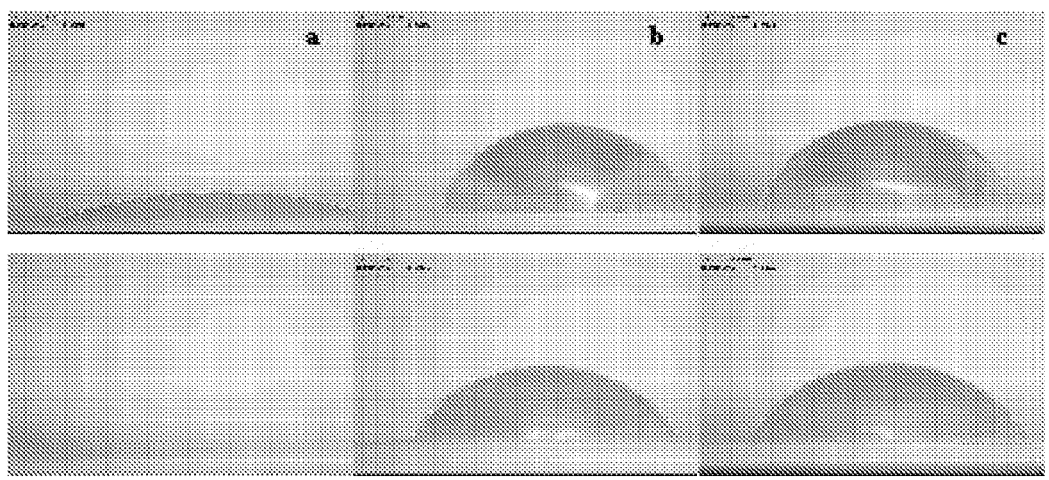
FIG. 30 (a)-(c) show representative images of water drops on the composite filled handsheets produced in accordance with one embodiment of the present invention. (a): unfilled handsheet; (b): 10% palmitic acid; (c): 30% palmitic acid to starch. Top: images take at 5 seconds after applying water to the handsheet; bottom: images take at 60 seconds after applying water to the handsheet.

One of the additional advantages of using clay-starch composites formed by fatty acid is that the fatty acid in the composites may increase the hydrophobicity of the filler, so the water repellent property of the paper sheets increases. The images from contact angle measurements showed that a much higher contact angle of water on the handsheets could be obtained even after 60 sec as shown in FIG. 30. However, a water droplet was immediately adsorbed into the handsheet with pure clay as the filler. It was also found that as the fatty acid ratio increased and the composite dosage increased, the wettability of the handsheets decreased. Even though the sizing degree of the composite filled paper may not be as high as AKD or ASA sized papers, the improvement in the hydrophobicity of paper sheets using starch-fatty acid-clay composite may significantly reduce the dosage of sizing agent during papermaking.

To sum up, this study provided a method of preparing clay-starch composite. The composite prepared may be used as papermaking filler with much higher paper strength than untreated clay. Clay-starch composites may increase bonding strength dramatically as shown by the ZDT test. The tensile strength was improved up to more than 100-200% at 15% composite addition compared to untreated clay. The optical properties increased as the composite amount in sheets increased. At the same brightness, the clay-starch composite filled handsheets have much higher tensile strength than unmodified clay filled sheets. Additionally, handsheets filled with clay-starch composites have improved water-repellant property due to the hydrophobicity of the fatty acids. The bonding of clay-starch composites with fibers was confirmed by SEM study.

Example 4

Materials

Calcined kaolin clay was obtained from Dry Branch Kaolin Co., Inc. (Dry Branch, Ga.). Raw corn starch was used for this experiment. Palmitic acid was obtained from Aldrich. Bleached hardwood and softwood pulps were each refined in a Valley beater to a freeness of 400 CSF. Equal proportions of the two pulps were mixed, and the mixture was used as the base pulp furnish for the handsheets. Unbleached softwood pulp was also refined to a freeness of 400 CSF. Cationic polyacrylamide (Percol-175) for filler retention was obtained from Ciba Specialty Chemicals.

Preparation of Fibrous Clay-starch Composites

The composites with an 1:1 clay to starch ratio was prepared as following: 5 g of clay was added to 1-30% uncooked raw corn starch suspension that contained 5 g of dry weight starch. The mixture then was stirred and cooked at 95° C. for 30 minutes. 0.5-1% of palmitic acid based on the solid weight of starch was added to the mixture of cooked starch and clay. 0.01 M NaOH was added and mixed for 30 minutes at the above the melting point of the palmitic acid. Cooked clay-starch mixture was poured into 0.1 M HCl and adjusted to pH 4-7 with 300 rpm stirring speed. After 30 seconds stirring, starch-clay composites were precipitated out. The supernatant became clear after a few hours and was removed. The precipitates of clay-starch composites were re-dispersed with pulp slurry by mechanical stirring before handsheet making. Composites with different solid content ratios were also prepared.

Handsheets Preparation and Determination of Paper Properties

The pulp was diluted to 0.5 wt % and various amounts of composite aggregates were added during the handsheet making. After the addition of composites, the slurry was stirred for 20 sec at 700 rpm without addition of any retention aids. Handsheets with a target basis weight of 60 g/m$^2$ were produced according to TAPPI Test Method T 205 "Forming Handsheets for Physical Tests of Pulp." For comparison, the control handsheets were prepared using pure clay and Percol-175 was added at 0.05-0.1 wt % based on solid fiber for clay retention. After two cycles of wet pressing, all handsheets were dried at 105° C. for 7 minutes using a dryer (Emerson Speed Dryer, Model 130). Physical properties of the papers were measured according to standard TAPPI methods. The filler content was determined by ashing the paper in a muffler oven according to the standard TAPPI method T211.

The Effects of Clay-starch Composites on the Bleached Kraft Pulp

Figure 31:
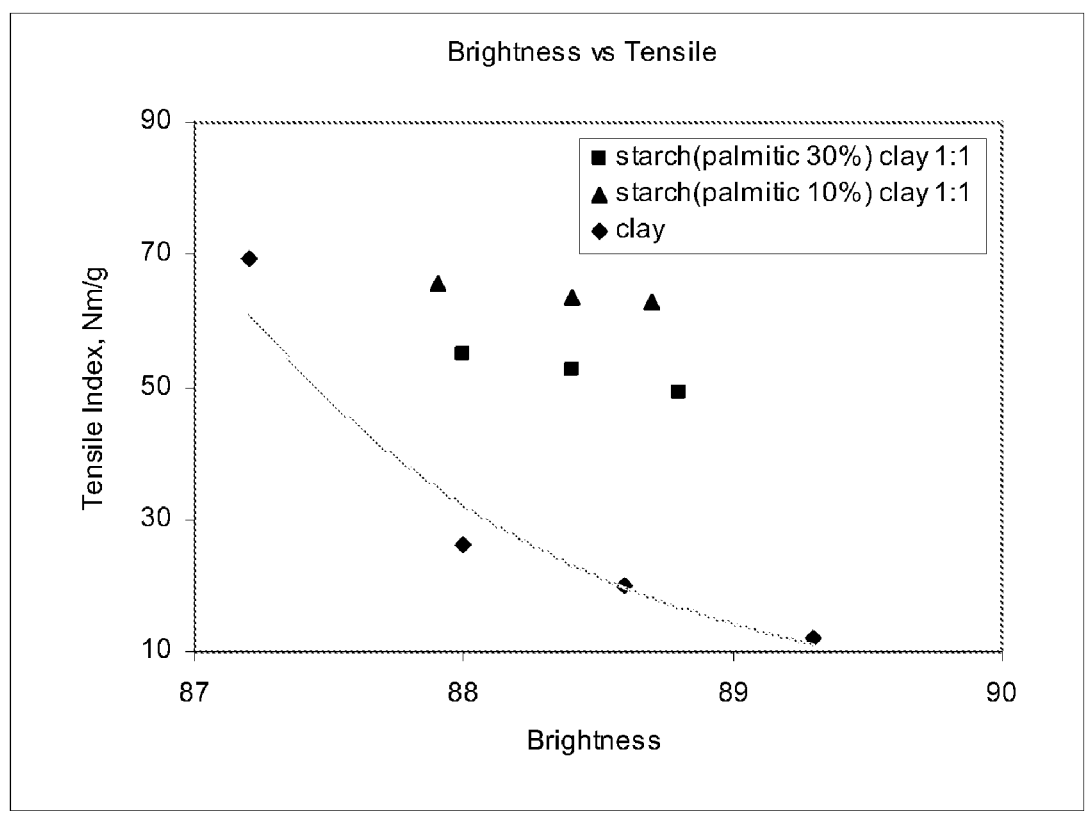
FIG. 31 shows the effects of clay-starch composites on tensile strength in accordance with one embodiment of the present invention. Bleached pulp (softwood:hardwood=50:50) was used in the study.

FIG. 31 shows the effects of the clay-starch composites on paper physical properties. These data indicate that clay-starch composites could significantly improve paper strength properties compared to conventional papermaking filler. As the content of pure clay increased, the tensile strength of the handsheet made from unmodified clay decreased significantly. Clay particles in handsheet interfere with the fiber bonding, which reduces the strength and number of inter-fiber bonds. Thus, increased clay content in handsheets caused a greater reduction in tensile strength. As shown in FIG. 1 the tensile strengths of the handsheets made from three different clay-starch composites increased about 100-200% compared to original clay at around 10% clay doses.

Figure 32:
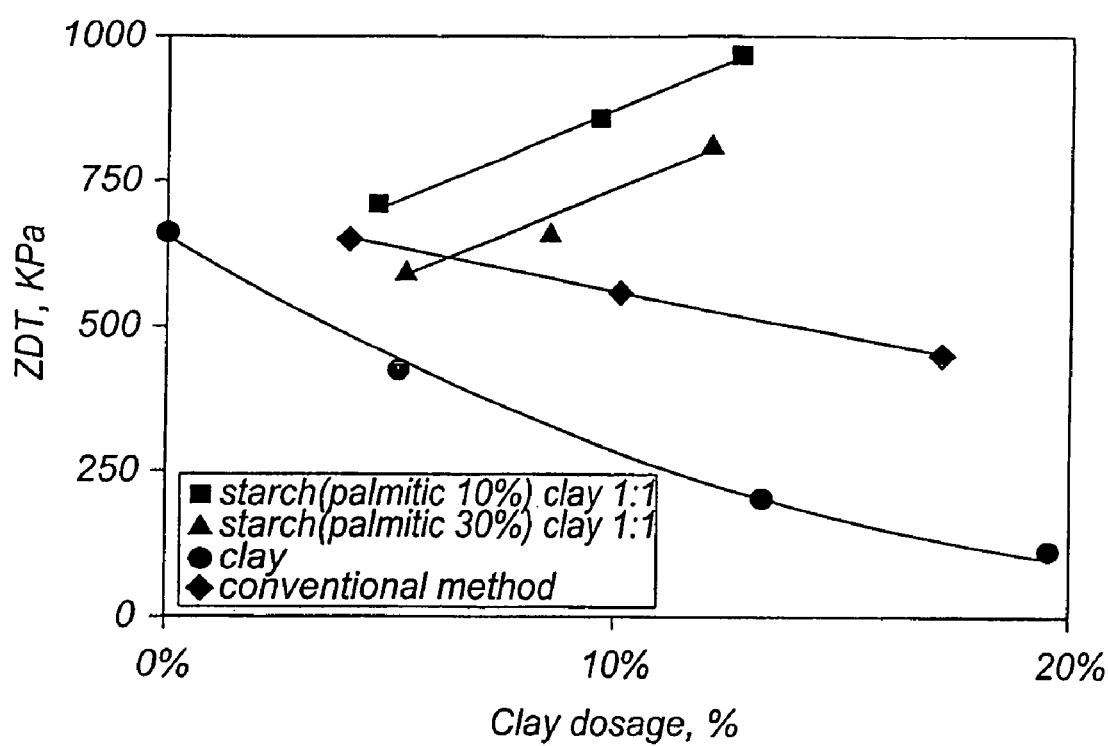
FIG. 32 shows the effects of clay-starch composites on ZDT strength in accordance with one embodiment of the present invention.

FIG. 32 shows the result of z-direction tensile strengths of clay-starch composites filled sheets. For clay-starch composites (1:1) filled sheets, ZDT increases as composite content increases. However, for the pure clay filled sheets, ZDT deceases as clay content increases. This result suggests that pure clay interferes with fiber-fiber bonding because there is no clay-fiber bonding, however, clay-starch composites may improve clay-fiber bonding due to starch coated on clay surface. The tendency of other physical properties such as the burst and folding strength using clay-starch composite was almost the same as that of tensile strength because of the improved internal bonding of the sheet by the starch.

Figure 33:
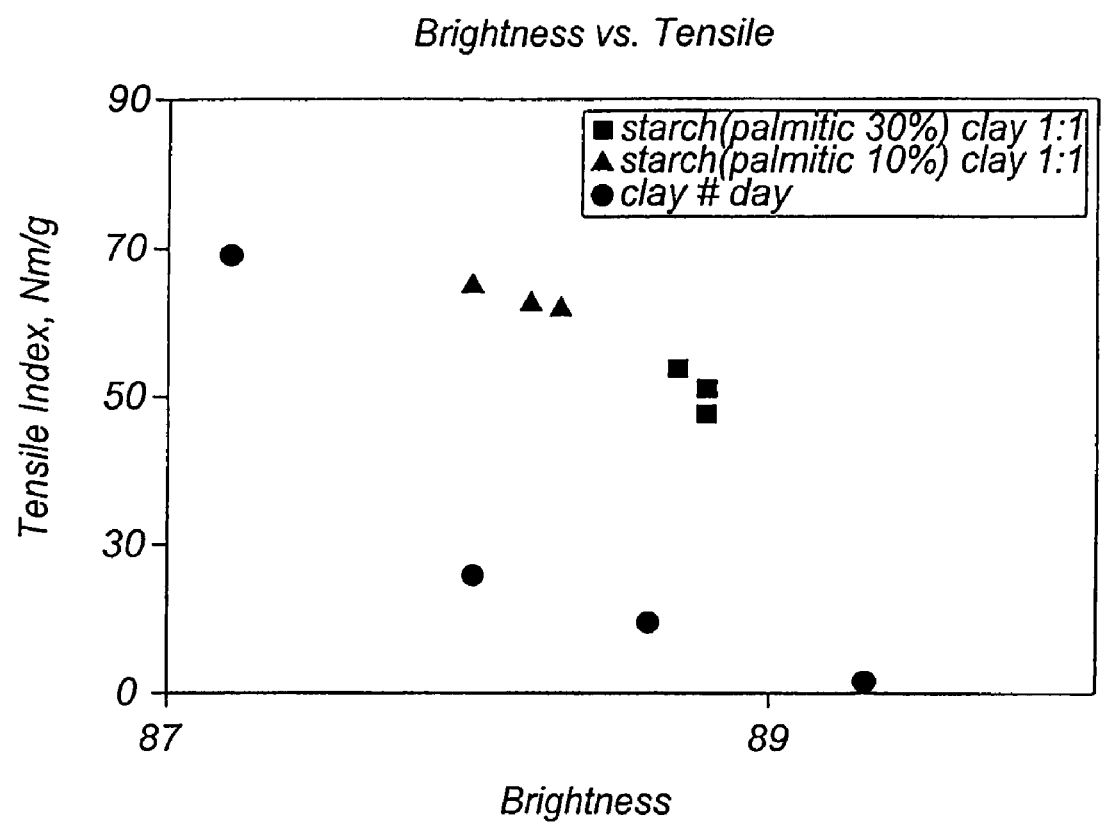
FIG. 33 shows the effects of clay-starch composites on brightness of the handsheets produced in accordance with one embodiment of the present invention.

FIG. 33 shows the brightness of handsheets made with pure clay and clay-starch composites. At the same tensile strength, the brightness of handsheets filled with the clay-starch composite was much higher than that of pure clay.

Figure 34:
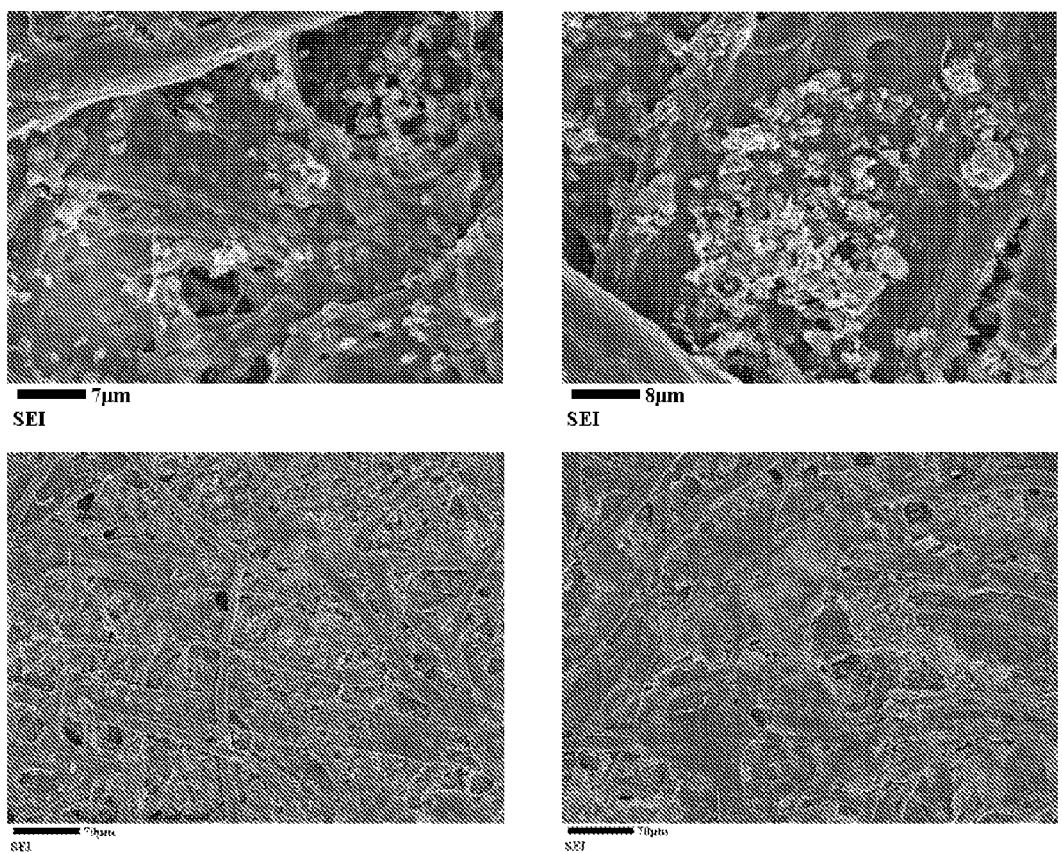
FIG. 34 shows the distribution of clay-starch composites on filled sheets using SEM.
Figure 35:
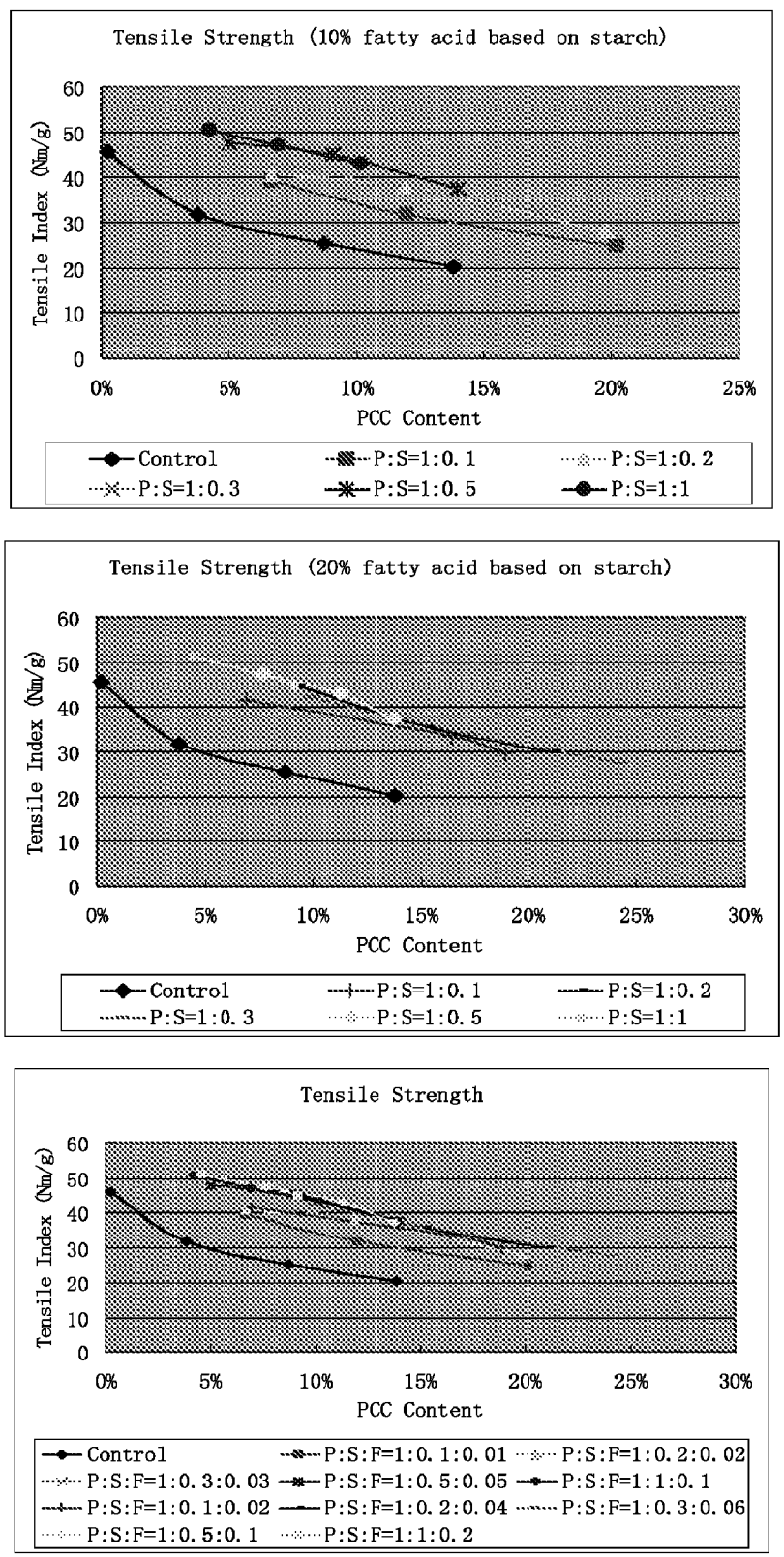
FIG. 35 shows the effects of modified filler on tensile strength of paper produced in accordance with one embodiment of the present invention. Top: Group A; middle: Group B; and bottom: both groups.
Figure 36:
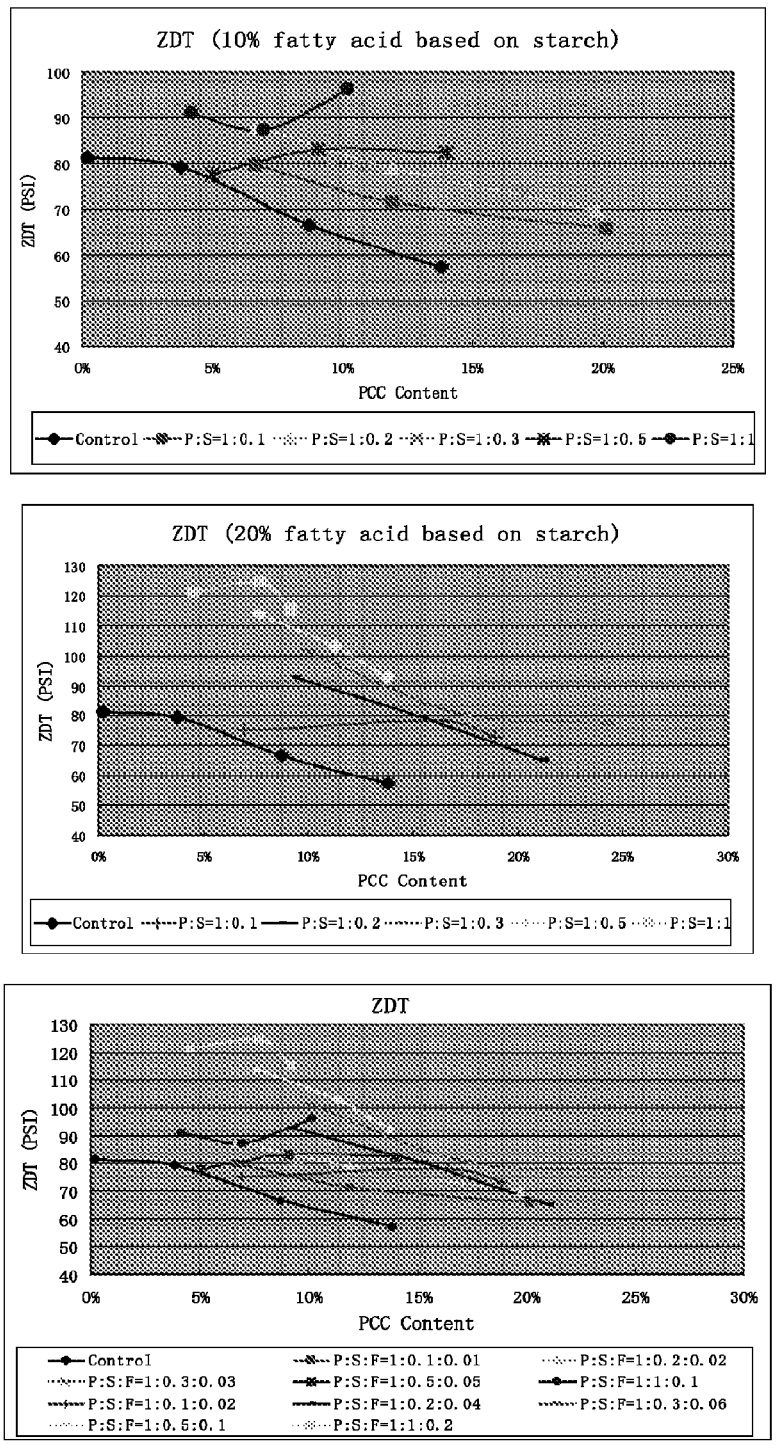
FIG. 36 shows the effects of modified filler on ZDT strength of paper produced in accordance with one embodiment of the present invention. Top: Group A; middle: Group B; and bottom: both groups.
Figure 37:
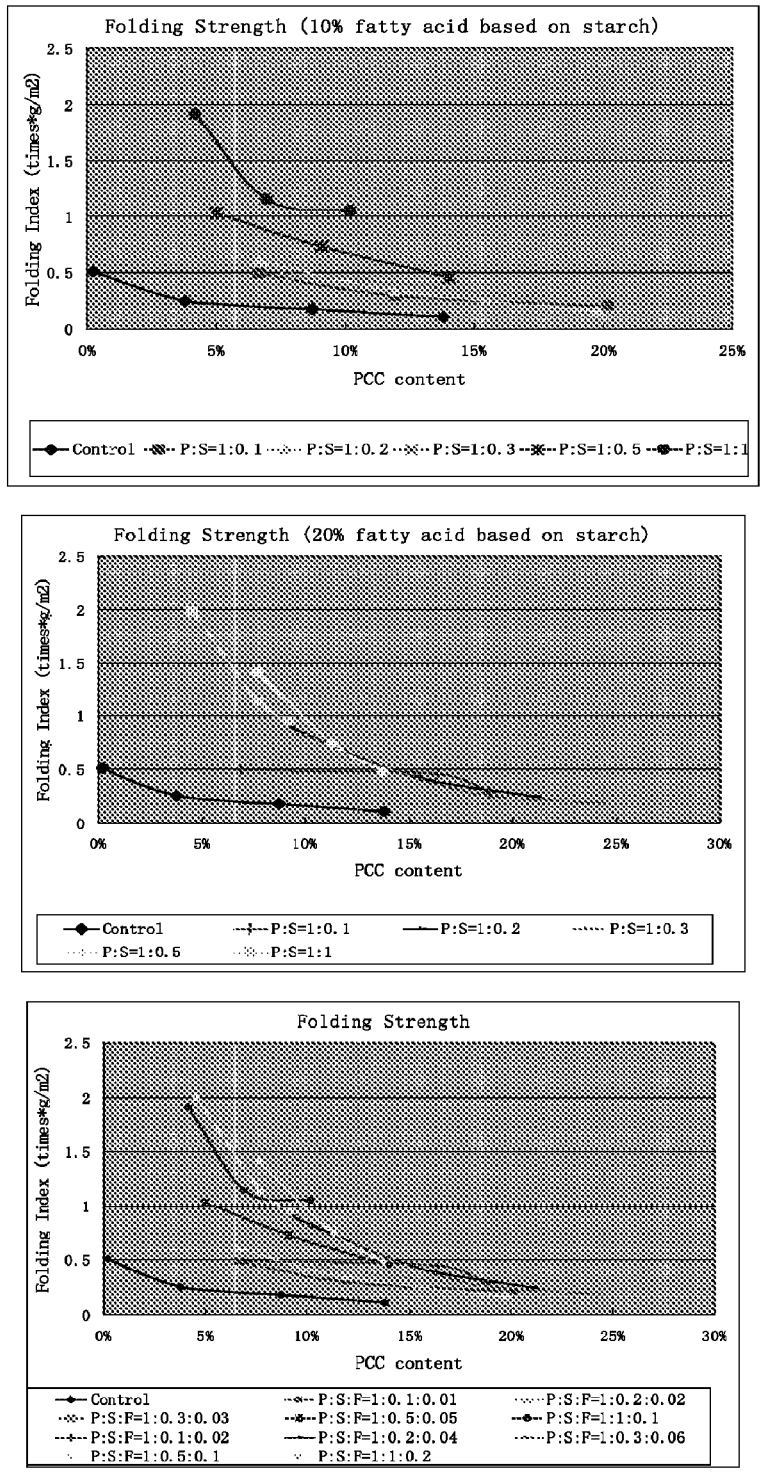
FIG. 37 shows the effects of modified filler on folding strength of paper produced in accordance with one embodiment of the present invention. Top: Group A; middle: Group B; and bottom: both groups.
Figure 38:
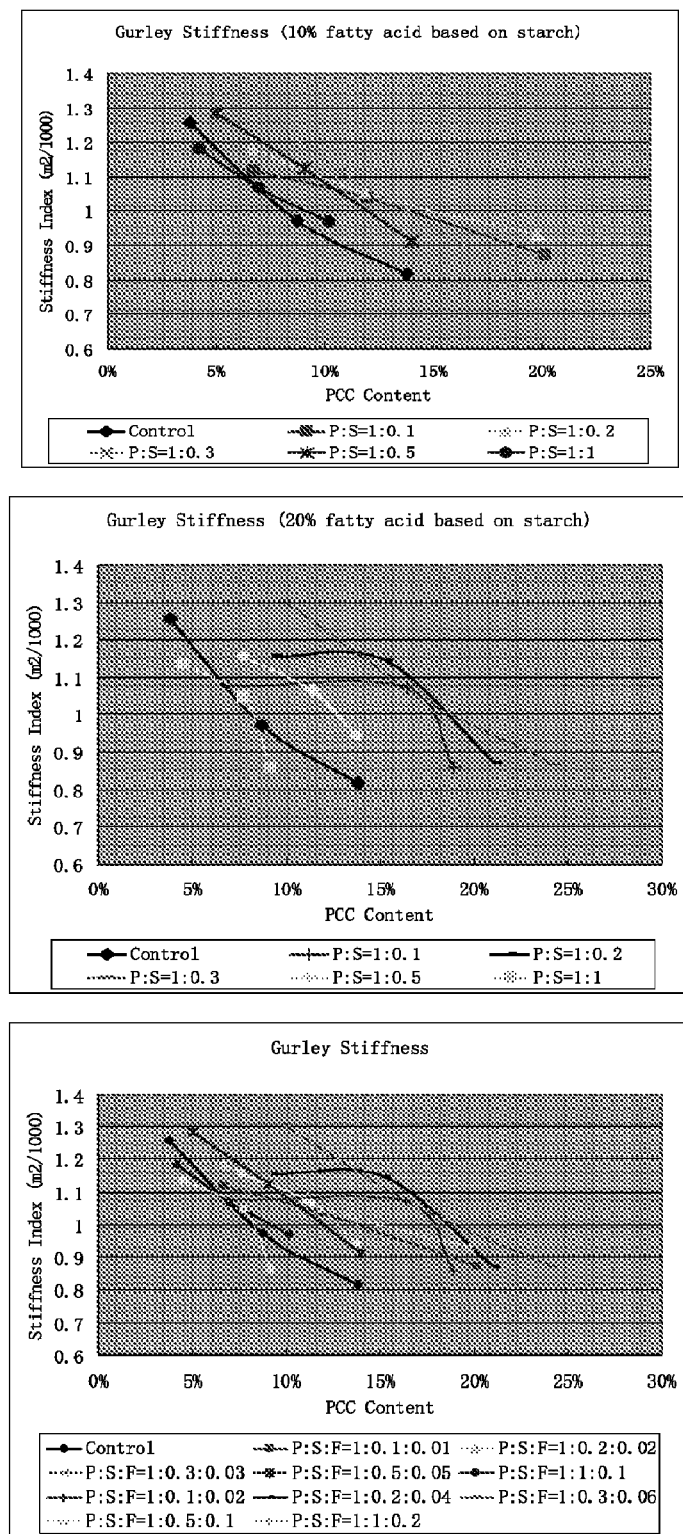
FIG. 38 shows the effects of modified filler on stiffness of paper produced in accordance with one embodiment of the present invention. Top: Group A; middle: Group B; and bottom: both groups.
Figure 39:
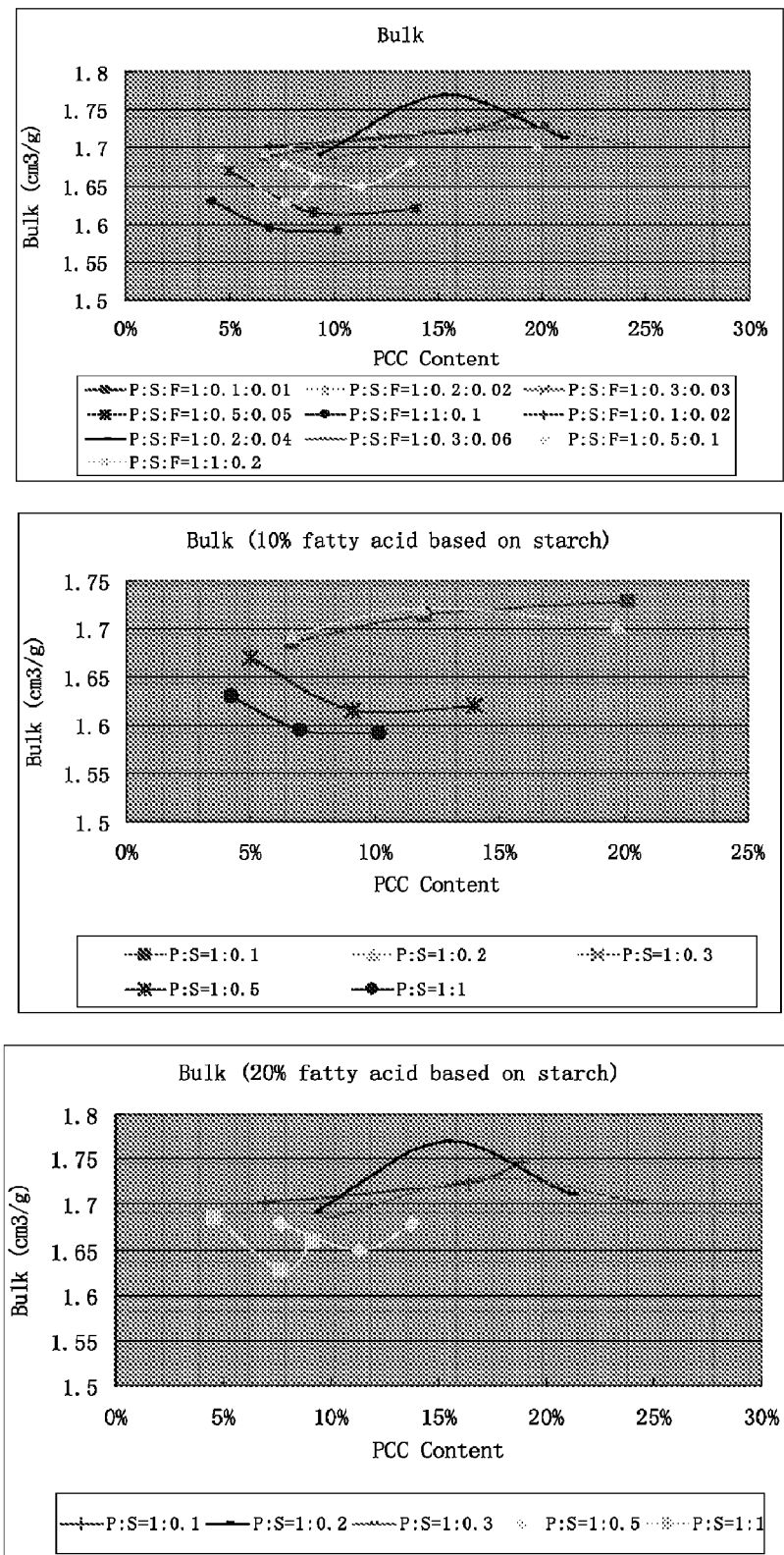
FIG. 39 shows the effects of modified filler on the bulk property of paper produced in accordance with one embodiment of the present invention. Top: Group A; middle: Group B; and bottom: both groups.
Figure 40:
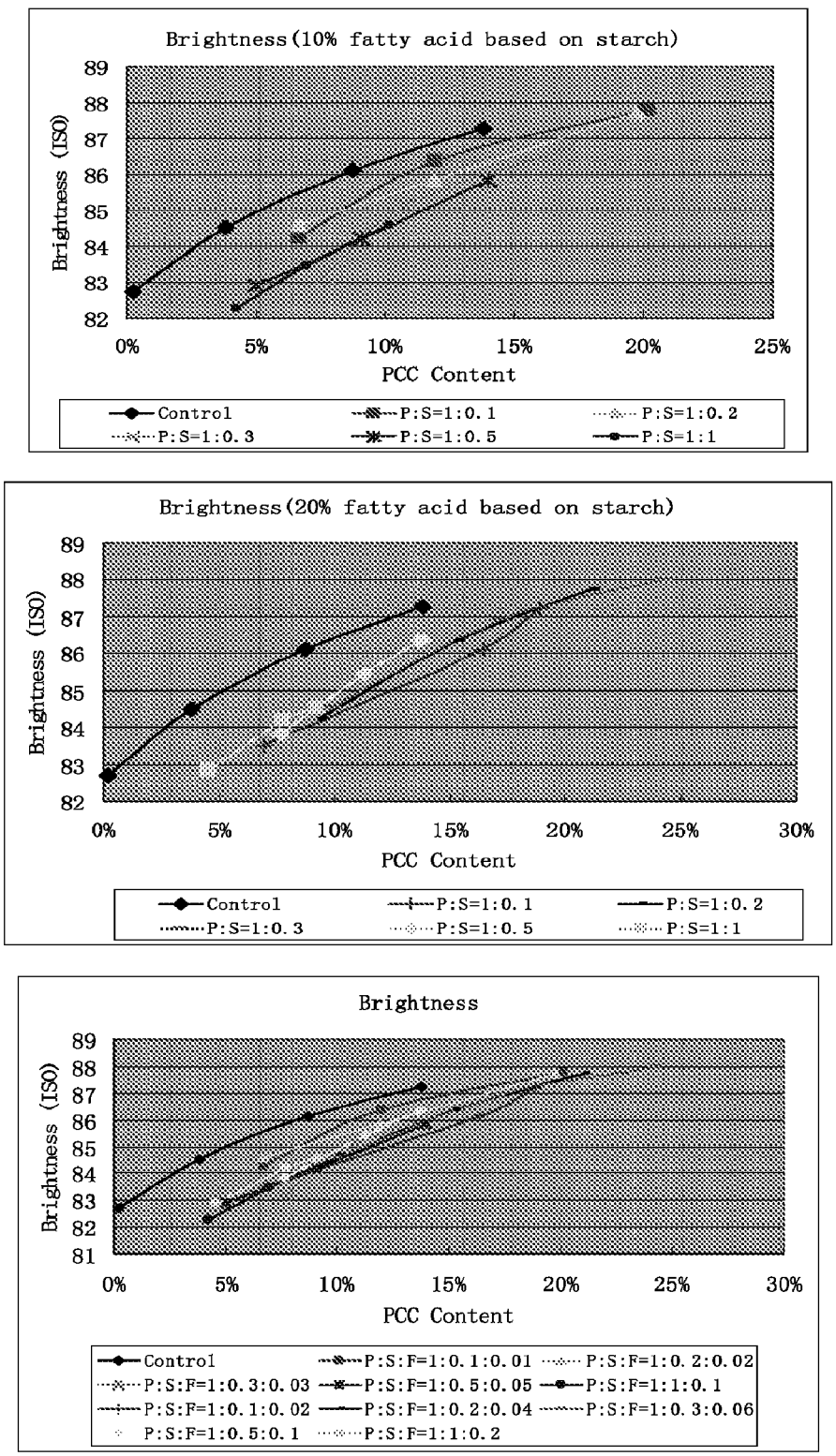
FIG. 40 shows the effects of modified filler on brightness of paper produced in accordance with one embodiment of the present invention. Top: Group A; middle: Group B; and bottom: both groups.
Figure 41:
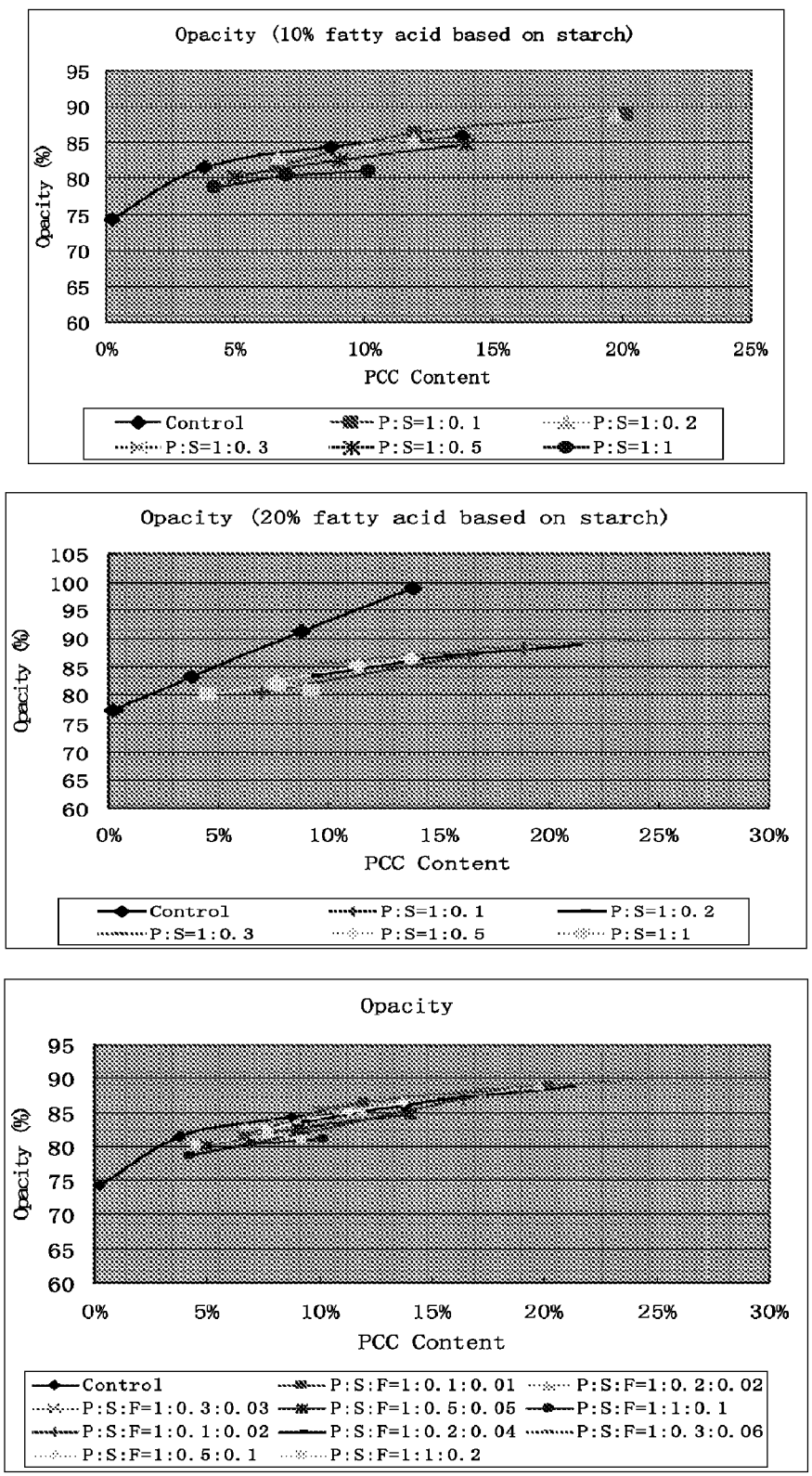
FIG. 41 shows the effects of modified filler on opacity of paper produced in accordance with one embodiment of the present invention. Top: Group A; middle: Group B; and bottom: both groups.

The size and distribution of composites affect brightness and physical properties. One of reasons that handsheets produced using compositions with higher ratio of palmitic acid to starch have lower physical strength and brightness is that the size of composites having 30% palmitic acid was bigger than that of composites having 10% palmitic acid. In addition, composites having 30% palmitic acid have a wider size distribution than composites having 10% palmitic acid. The surface and the distribution of composites are investigated using SEM (see, FIG. 34).

Example 5

This study was aimed to improve paper strength by increasing filler-filler and filler-fiber bonding. PCC was modified using starch and fatty acid complex in this study. It was found that filler aggregates were formed during the fatty acid precipitation process. Filler surface was fully covered by the polymers. The size of the aggregates was in the range of 55-75 microns. Handsheets were made using the modified filler, and the effects of the novel fillers on the paper properties were investigated. Handsheet properties including tensile, folding, ZDT, stiffness, brightness, opacity, and bulk were measured. The results indicated that the modified fillers could significantly improve paper strength compared to the unmodified PCC. It was revealed that increased starch amount based on PCC content may lead to the improvement of paper strength, such as, tensile, folding, and/or ZDT. It was also found that the optimum fatty acid amount may be in the range of 10-20% based on starch amount.

Filler Modification

The composite with PCC-to-starch-to-fatty acid ratio of 1:1:0.1 was prepared as following: 3% uncooked raw corn starch was cooked at 95° C. for 30 min. The pH of the mixture was adjusted to 11 by adding 0.01 M potassium hydroxide (KOH), and required amount of palmitic acid was added to the cooked starch. After stirring the cooked starch-fatty acid mixture for 10 min, the mixture was poured into 5% PCC suspension at 200 rpm stirring speed. The PCC-starch composites were formed immediately and the resultant composites were directly used for making handsheets. PCC-starch composites with different solid ratios were prepared by changing the PCC concentration. Composites with different palmitic acid ratios (10% and 20% on the basis of the solid starch) were also prepared.

Handsheets Preparation

Handsheets with the basis weight of 60 g/m$^2$ were prepared according to Tappi Standard Method. Pulp slurry contained 30% bleached softwood kraft pulp with 411 CSF and 70% bleached hardwood kraft pulp with 400 CSF. Required amount of filler was mixed with pulp slurry before handsheet formation. No retention aid was adopted for the modified fillers in this study. For the purposes of comparison, the control handsheets were prepared using unmodified PCC with 1% cationic starch added during handsheet formation. After wet pressing twice at 50 psi for 5 min and 2 min, respectively, all handsheets were dried at 105° C. for 7 min on an Emerson Speed Dryer (Model 130). The physical and optical properties of the paper were measured using TAPPI standard methods. Ten measurements were performed, and the data were averaged for each strength value. The PCC content was determined by EDTA titration method.

Results and Discussion

FIGS. 35-43 show the effects of the modified fillers on the physical properties and optical properties of handsheets produced in accordance with the methods of the present invention.

The ratios of fatty acid to starch were 10% or 20% (based on starch). The ratios of PCC to starch were 1:0.1, 1:0.2, 1:0.3, 1:0.5, or 1:1. Therefore, totally ten combinations were designed for this experiment as listed below:

Group A: 10% fatty acid based on starch (P is PCC; S is starch; F is fatty acid)
P:S:F=1:0.1:0.01
P:S:F=1:0.2:0.02
P:S:F=1:0.3:0.03
P:S:F=1:0.5:0.05
P:S:F=1:1:0.1

Group B: 20% fatty acid based on starch (P is PCC; S is starch; F is fatty acid)
P:S:F=1:0.1:0.02
P:S:F=1:0.2:0.04

P:S:F=1:0.3:0.06
P:S:F=1:0.5:0.1
P:S:F=1:1:0.2

In additional to above conditions, the handsheets with different content of unmodified PCC and 1% cationic starch were investigated, which was used/marked as control.

FIGS. 35-39 show the effects of the modified filler on the paper strength. The tensile strength, folding strength, and ZDT were improved significantly and increased as the ratio of starch to PCC increased for both 10% and 20% fatty acid conditions. The utilization of modified fillers also improved stiffness property.

The effect of modified filler on the bulk was not significant. Increasing starch to PCC ratio slightly decreased paper bulk property for 10% fatty acid condition. In the case of 20% fatty acid, the ratios of starch to PCC did not significantly affect the bulk property.

Figure 42:
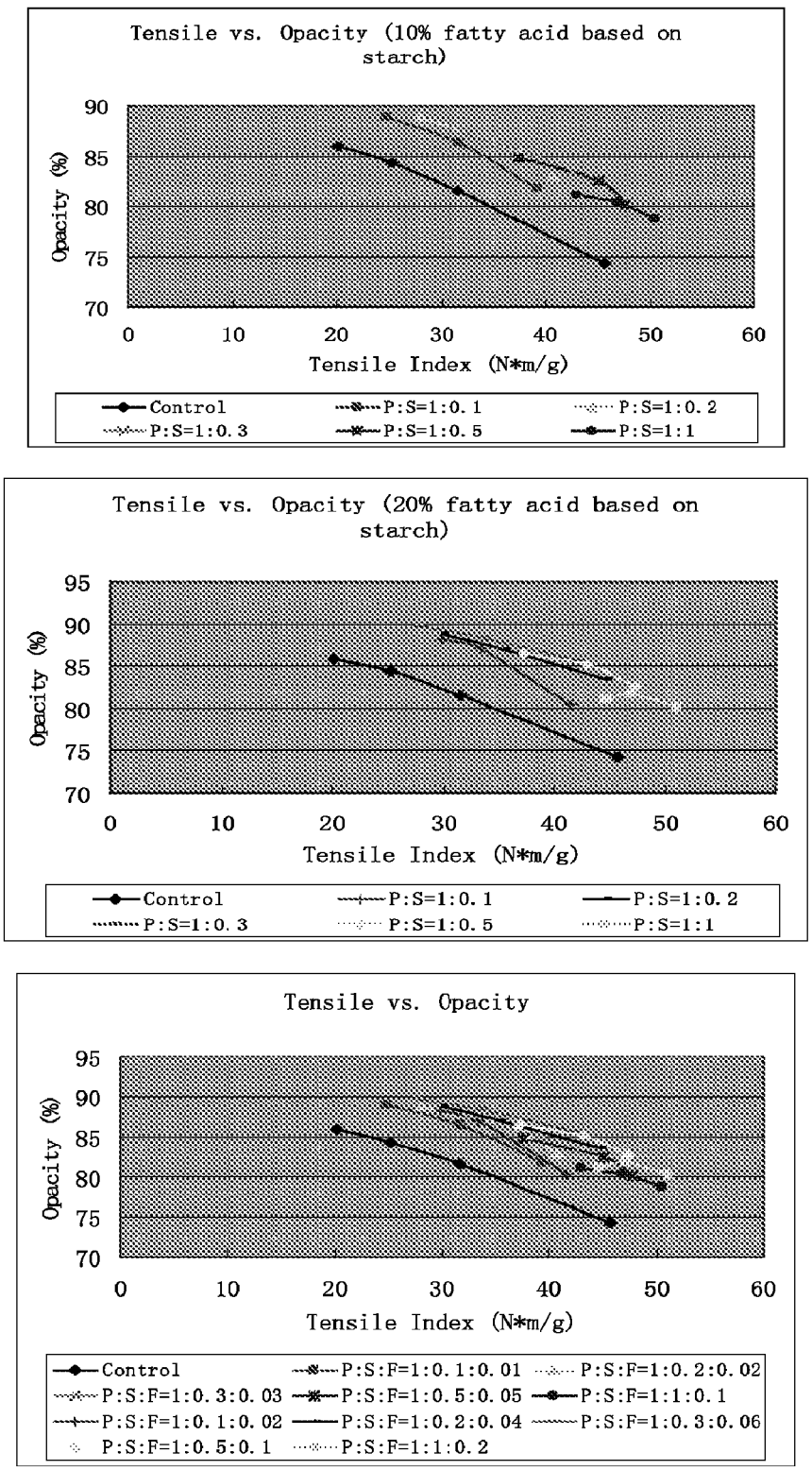
FIG. 42 shows the opacity and tensile index of handsheets made with modified and unmodified filler in accordance with one embodiment of the present invention. Top: Group A; middle: Group B; and bottom: both groups.
Figure 43:
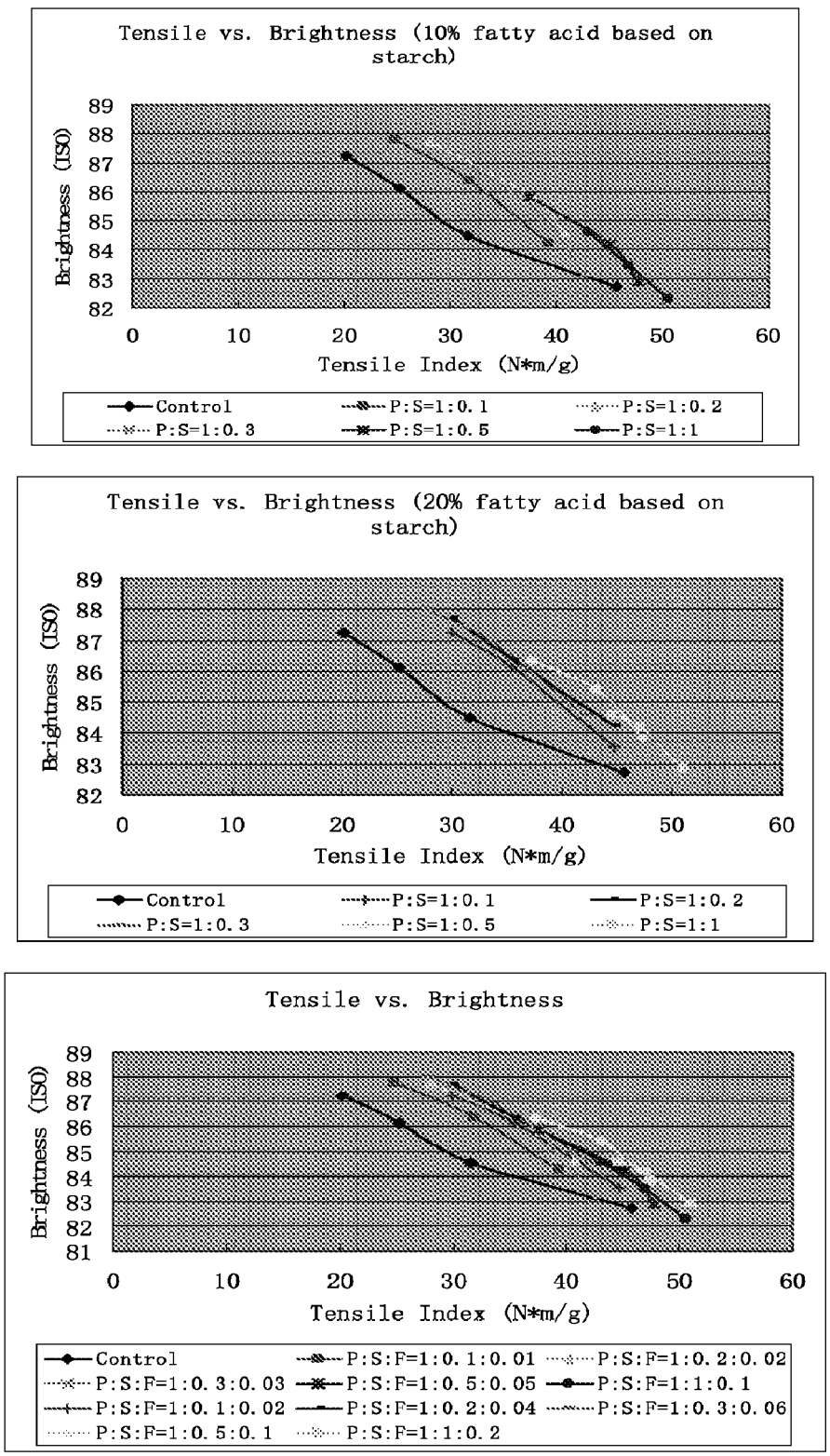
FIG. 43 shows the brightness and tensile index of handsheets made with modified and unmodified filler in accordance with one embodiment of the present invention. Top: Group A; middle: Group B; and bottom: both groups.

Although modified filler provided lower optical properties compared to the unmodified PCC at the same PCC level, the brightness, the strength, and optical properties were improved by adding more modified fillers. As shown in FIGS. 42-43, all the curves for paper containing modified filler stay on the upper right level of the control curve, indicating that modified filler may afford the paper product better optical properties (such as opacity and brightness) at the same required strength level. Higher starch to PCC ratio provided better optical properties at the same strength level.

Example 6

Similar to starch-fatty acid complex, starch-rosin acid complex may also be formed and used to modify a filler to improve its property. For example, starch-rosin complex coated fillers were prepared by the inventors using the following protocol: cooking 3% starch suspension for 1 hour at 95° C.; dissolving 0.3 g rosin acid in 15 ml 10% NaOH (e.g., by heating the NaOH solution containing rosin acid in water bath at 90° C. until the rosin was completely dissolved); adding dissolved rosin acid (about 10% based on starch) to the starch suspension; adjusting pH of the mixture to around 10 using NaOH solution; maintaining the mixture at 95° C. for 0.5 hour; adding well dispersed filler slurry at a starch:filler ratio of 1:1 to the reaction mixture; mixing for 10 minutes; and pouring the reaction mixture into a beaker with diluted HCl solution (pH 3-5). Fillers containing starch-rosin acid on surface (e.g., Fillers-starch-rosin acid aggregates with sizes of over 50 micrometers) were formed and precipitated from the reaction mixture. The above-mentioned protocol was successfully used by the inventors to create surface modified clay, PCC, and $CaSO_4$ fillers.

While the invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. A method for making a modified filler for use in a papermaking process, comprising:
    applying a starch composition comprising starch to a reaction composition comprising at least one of fatty acid, rosin acid, and ammonium sulfate to form a reaction mixture;
    applying a filler composition comprising a filler to the reaction mixture, thereby forming a modified filler, wherein the modified filler comprises starch on its surface;
    crosslinking at least a portion of the starch on the surface of the modified filler with a crosslinker; and
    adjusting the pH of the reaction mixture to precipitate the modified filler.

2. The method of claim 1, wherein the starch composition, the reaction composition, and the filler composition are mixed substantially simultaneously.

3. The method of claim 1, wherein the reaction composition comprises at least one of fatty acid, rosin acid, and a salt thereof.

4. The method of claim 3, wherein the modified filler comprises a fatty acid-starch or a rosin acid-starch complex on its surface.

5. The method of claim 3, wherein the fatty acid is palmitic acid.

6. The method of claim 1, wherein the pH of the reaction mixture is a pH of less than about 7.

7. The method of claim 6, wherein the filler comprises clay.

8. The method of claim 1, wherein the filler comprises calcium sulfate.

9. A method for making a modified filler for use in a papermaking process, comprising:
    applying a reaction composition comprising at least one of fatty acid and rosin acid to a starch composition comprising starch to form a reaction mixture;
    applying a filler composition comprising precipitated calcium carbonate ("PCC") to the reaction mixture, thereby forming a modified filler comprising PCC and further comprising starch on its surface;
    crosslinking at least a portion of the starch on the surface of the modified filler with a crosslinker; and
    adjusting the pH of the reaction mixture to precipitate the modified filler,
    wherein the fatty acid:starch ratio or the rosin acid:starch ratio is above about 10%.

10. The method of claim 9, wherein the starch:filler ratio is from about 30% to about 200%.

11. The method of claim 9, further comprising adjusting pH of the starch composition or the reaction mixture to a pH of above about 7.

12. A method of using a modified filler in a papermaking process, comprising:
    applying a modified filler to a composition comprising fiber to form a mixture; and
    processing the mixture, whereby producing a paper, wherein the modified filler is produced in accordance with a method comprising:
    applying a starch composition comprising starch to a reaction composition comprising at least one of fatty acid, rosin acid, and ammonium sulfate to form a reaction mixture;
    applying a filler composition comprising a filler to the reaction mixture, thereby forming a modified filler, wherein the modified filler comprises a starch on its surface;
    crosslinking at least a portion of the starch on the surface of the modified filler with a crosslinker; and
    adjusting the pH of the reaction mixture to precipitate the modified filler.

13. The method of claim 12, wherein the starch composition, the reaction composition, and the filler composition are mixed substantially simultaneously.

14. The method of claim 12, wherein the reaction composition comprises at least one of fatty acid, rosin acid, and a salt thereof.

15. The method of claim 12, wherein the pH of the starch composition or the reaction mixture is a pH of less than about 7.

16. The method of claim 15, wherein the filler comprises clay.

17. The method of claim 12, wherein the filler comprises calcium sulfate.

18. A method of using a modified filler in a papermaking process, comprising:
applying a modified filler to a composition comprising fiber to form a mixture; and
processing the mixture, whereby producing a paper, wherein the modified filler is produced in accordance with a method comprising:
applying a reaction composition comprising at least one of fatty acid and rosin acid to a starch composition comprising starch to form a reaction mixture;
applying a filler composition comprising PCC to the reaction mixture, thereby forming a modified filler comprising PCC and further comprising starch on its surface;
crosslinking at least a portion of the starch of the modified filler with a crosslinker; and
adjusting the pH of the reaction mixture to precipitate the modified filler,
wherein the fatty acid:starch ratio or the rosin acid:starch ratio is above about 10%.

19. The method of claim 18, wherein the starch:filler ratio is from about 30% to about 200%.

20. The method of claim 18, wherein the pH of the starch composition or the reaction mixture is a pH of less than about 7.

21. A paper with improved strength or optical property produced in accordance with a method comprising:
applying a modified filler to a composition comprising fiber to form a mixture; and
processing the mixture, whereby producing a paper comprising the modified filler, wherein:
the modified filler is produced in accordance with a method selected from the group consisting of a first method and a second method,
wherein the first method comprises:
applying a starch composition comprising starch to a first reaction composition comprising at least one of fatty acid, rosin acid, and ammonium sulfate to form a first reaction mixture;
applying a first filler composition comprising a first filler to the first reaction mixture, thereby forming a modified filler, wherein the modified filler comprises starch on its surface; and
crosslinking at least a portion of the starch on the surface of the modified filler with a crosslinker; and
wherein the second method comprises:
applying a second reaction composition comprising at least one of fatty acid and rosin acid to a starch composition comprising starch to form a second reaction mixture;
applying a filler composition comprising PCC to the second reaction mixture, thereby forming a modified filler, wherein the modified filler comprises starch on its surface;
crosslinking at least a portion of the starch on the surface of the modified filler with a crosslinker; and
adjusting the pH of the reaction mixture to precipitate the modified filler, wherein the fatty acid:starch ratio or the rosin acid:starch ratio is above about 10%.

\* \* \* \* \*